United States Patent
Radhakrishnan

(10) Patent No.: US 7,284,054 B2
(45) Date of Patent: Oct. 16, 2007

(54) SYSTEMS, METHODS, AND ARTICLES OF MANUFACTURE FOR ALIGNING SERVICE CONTAINERS

(75) Inventor: Rakesh Radhakrishnan, Ashburn, VA (US)

(73) Assignee: Sun Microsystems, Inc., Menlo Park, CA (US)

( * ) Notice: Subject to any disclaimer, the term of this patent is extended or adjusted under 35 U.S.C. 154(b) by 886 days.

(21) Appl. No.: 10/411,157

(22) Filed: Apr. 11, 2003

(65) Prior Publication Data

US 2004/0205101 A1    Oct. 14, 2004

(51) Int. Cl.
*G06F 15/173*    (2006.01)

(52) U.S. Cl. .......... 709/226; 709/203; 709/224; 705/1; 705/8; 705/14; 705/26

(58) Field of Classification Search ........ 709/203, 709/206, 223, 226; 705/10, 26, 30; 455/453; 706/46; 701/33
See application file for complete search history.

(56) References Cited

U.S. PATENT DOCUMENTS

| | | | |
|---|---|---|---|
| 6,625,651 B1 * | 9/2003 | Swartz et al. ............ | 709/226 |
| 6,854,014 B1 * | 2/2005 | Amin et al. ............. | 709/227 |
| 6,868,441 B2 * | 3/2005 | Greene et al. .......... | 709/220 |
| 7,006,831 B2 * | 2/2006 | Matz et al. .............. | 455/453 |
| 7,020,697 B1 * | 3/2006 | Goodman et al. ....... | 709/223 |
| 7,127,455 B2 * | 10/2006 | Carson et al. ........... | 707/3 |
| 2002/0029101 A1 * | 3/2002 | Larson et al. ........... | 701/33 |
| 2002/0120697 A1 * | 8/2002 | Generous et al. ....... | 709/206 |
| 2002/0123365 A1 * | 9/2002 | Thorson et al. ......... | 455/524 |
| 2002/0143949 A1 * | 10/2002 | Rajarajan et al. ....... | 709/226 |
| 2002/0152319 A1 * | 10/2002 | Amin et al. ............. | 709/232 |
| 2002/0169658 A1 * | 11/2002 | Adler ...................... | 705/10 |
| 2002/0194053 A1 * | 12/2002 | Barrett et al. ........... | 705/10 |
| 2003/0061132 A1 * | 3/2003 | Yu et al. .................. | 705/30 |
| 2003/0120502 A1 * | 6/2003 | Robb et al. .............. | 705/1 |
| 2003/0144894 A1 * | 7/2003 | Robertson et al. ...... | 705/8 |
| 2003/0208533 A1 * | 11/2003 | Farquharson et al. ... | 709/203 |
| 2003/0236961 A1 * | 12/2003 | Qiu et al. ................ | 711/170 |
| 2004/0006516 A1 * | 1/2004 | Anagol-Subbarao et al. | 705/26 |
| 2004/0030705 A1 * | 2/2004 | Bowman-Amuah ..... | 707/100 |
| 2004/0030777 A1 * | 2/2004 | Reedy et al. ............ | 709/224 |
| 2004/0064548 A1 * | 4/2004 | Adams et al. ........... | 709/224 |
| 2004/0093326 A1 * | 5/2004 | Carson et al. ........... | 707/3 |

(Continued)

OTHER PUBLICATIONS

SLA-driven management of distributed systems using the common information model☐☐Debusmann, M.; Keller, A.;☐☐Integrated Network Management, 2003. IFIP/IEEE Eighth International Symposium on ☐☐Mar. 24-28, 2003 pp. 563-576.*

(Continued)

*Primary Examiner*—Thong Vu
(74) *Attorney, Agent, or Firm*—Finnegan, Henderson, Farabow, Garrett & Dunner, L.L.P.

(57) ABSTRACT

Methods and systems consistent with certain aspects related to the present invention provide a process for aligning service containers in a system environment. In one aspect of the invention, the process may include receiving first event data from an application service container providing application services during runtime of a web service and receiving second event data from a system service container providing system services during runtime of the web service. The process may also dynamically align the system and application services such that a predetermined service level associated with the web service is met during runtime based on at least one of the first and second event data.

31 Claims, 21 Drawing Sheets

U.S. PATENT DOCUMENTS

| | | | |
|---|---|---|---|
| 2004/0098306 A1* | 5/2004 | Fitzpatrick et al. | 705/14 |
| 2004/0098311 A1* | 5/2004 | Nair et al. | 705/26 |
| 2004/0111506 A1* | 6/2004 | Kundu et al. | 709/223 |
| 2004/0148370 A1* | 7/2004 | Sadiq | 709/223 |
| 2004/0186905 A1* | 9/2004 | Young et al. | 709/225 |
| 2004/0225629 A1* | 11/2004 | Eder | 706/46 |

OTHER PUBLICATIONS

A SLA framework for QoS provisioning and dynamic capacity allocation☐☐Garg, R.; Saran, H.; Randhawa, R.S.; Singh, M.;☐☐Quality of Service, 2002. Tenth IEEE International Workshop on☐☐May 15-17, 2002 pp. 129-137.*

Enhancing a web-server cluster with quality of service mechanisms☐☐Cardellini, V.; Casalicchio, E.; Colajanni, M.; Mambelli, M.;☐☐Performance, Computing, and Communications Conference, 2002. 21st IEEE International☐☐Apr. 3-5, 2002 pp. 205-212.*

SLA management in federated environments; Bhoj, P.; Singhal, S.; Chutani, S.; Integrated Network Management, 1999. Distributed Management for the Networked Millennium. Proceedings of the Sixth IFIP/IEEE International Symposium on May 24-28, 1999 pp. 293-308.*

Heiko Ludwig et al., *A Service Level Agreement Language for Dynamic Electronic Services*, Proceedings of the 4th IEEE Int'l Workshop on Advanced Issues of E-Commerce and Web-Based Information Systems (WECWIS 2002).

Frank Leyman, *Web Services: Distributed Applications Without Limits—An Outline-*, .XP-002348011.

P. Bhoj et al., *SLA Management in Federated Environments*, Computer Networks 35 (2001) pp. 5-24.

http://www.iro/umontreal.com/-keller/Layla, *Managed Object Pattern*, Class Behavioral, XP-002348012 pp. 1-4.

Rasit Eskicioglu, *Hierarchical, Container-based Grid Resource Management*, Computer Science Department Advanced Networking Research Laboratory, XP-002348013.

Christopher Alexander, *Observer*, Observer, Object Behavioral, XP-002348024, pp. 293-300.

Program Aufruf zur Teilahme: deutsch/englisch Program zum Herunterladen: deutsch/englisch, XP-002348014.

Keller@iro.umontreal.ca, *Layla—cadre d'application*, XP-002348015.

Dr. Peter C.J. Graham, *Links: Schedule Research Teaching Supervision Professional Service Support*, XP-002348016.

European Search Report re: EP 04 25 2127 dated Oct. 19, 2005.

Khalidi, Yousef, "N1: Revolutionary IT Architecture for Business," www.sun.com/software/solutions/n1/essays/khalidi.html, visitied Feb. 13, 2003, pp. 1-5.

"Sun Ships Sun One Platform for Network Identity," www.sun.com/smi/Press/sunflash/2002-03/sunflash.20020312.1html, visited Feb. 13, 2003, pp. 1-3.

"N1: Revolutionary IT Architecture for Business," wwws.sun.com/software/solutions/n1/arch.html, visited Feb. 13, 2003, p. 1.

"Sun ONE Overview," www.sun/com/software/sunone/overview/platform/index.html, visitied Feb. 13, 2003, pp. 1-2.

Sun Open Net Environment (Sun One), White Papers, "Sun Open Net Environment (Sun ONE) Software Archtecture," www.sun.com.au/products/software/sunone/wp-arch, visited Feb. 14, 2003, pp. 1-16.

Sun ONE Architecture Guide, Chapter 3, "J2EE Components and Containers," downloaded from Internet (site unknown) on Feb. 14, 2003.

Thure, Karen et al., "The Sun ONE Architecture," sunonedev.sun.com/platform.architecture/quickstart_overview.html, visited Feb. 13, 2003; pp. 1-14.

Ramachandran, V "Design Patterns for Optimizing the Performance of J2EE Applications", developer.java.sun.com/developer/technicalArticles/J2EE/J2EEpatterns, visited Feb. 14, 2003, pp. 1-7.

"Better By Design—The Solaris 9 Operating Environment, A technical White Paper," Sun Microsystems, Inc. 2002, pp. 1-39.

Pawlan, Monica, "Introduction to the J2EE Platform," developer.java.sun.com/developer/technicalArticles/J2EEE/Intro/index.html, visited Mar. 11, 2003, pp. 1-18.

"Powering the Collaborative Enterprise, Sun ONE and Java Technology in the Extended Supply Chain, A Technical White Paper," Sun Microsystems, Inc. 2002, pp. 1-26.

"Sun ONE Developer Platform- A Sun Open Net Environment Technical White Paper," Sun Microsystems, Inc., Jan. 2003, pp. 1-44.

Allen, Charlotte et al., "LDAP Directory-Based Dynamic Publishing," Sun Microsystems Inc., Nov. 2002, pp. 1-34.

"N1: Revolutionary IT Architecture for Business" www.sun.com/software/solutions/n1/overview.html, visited Feb. 13, 2003, pp. 1-3.

Radhakrishnan, R., "A nine-Step Process for Deriving Infrastructure Architecture from a J2EE Technology Application Architecture," Sun Microsystems, Inc., 2001, pp. 1-14.

Radhakrishnan, R. "Strategic Technology Arhcitecture Roadmap," Sun Mircorsystems, Inc., 2001, pp. 1-28.

Heiko Ludwig et al., *A Service Level Agreement Language for Dynamic Electronic Services*, Proceedings of the 4th IEEE Int'l Workshop on Advanced Issues of E-Commerce and Web-Based Information Systems (WECWIS 2002), 2001.

Frank Leyman, *Web Services: Distributed Applications Without Limits —An Outline-*, .XP-002348011, 2003.

P. Bhoj et al., *SLA Management in Federated Environments*, Computer Networks 35 (2001) pp. 5-24, 2001.

http://www.iro/umontreal.ca/-keller/Layla, *Managed Object Pattern*, Class Behavioral, XP-002348012 pp. 1-4, 2001.

Rasit Eskicioglu, *Hierarchical, Container-based Grid Resource Management*, Computer Science Department Advanced Networking Research Laboratory, XP-002348013, 2001.

Christopher Alexander, *Observer*, Observer, Object Behavioral, XP-002348024, pp. 293-300, 1995.

Program Aufruf zur Teilahme: deutsch/englisch Program zum Herunterladen: deutsch/englisch, XP-002348014, 2003.

keller@iro.umontreal.ca, *Layla—cadre d'application*, XP-002348015, 2001.

Dr. Peter C.J. Graham, *Links: Schedule Research Teaching Supervision Professional Service Support*, XP-002348016, 2004.

* cited by examiner

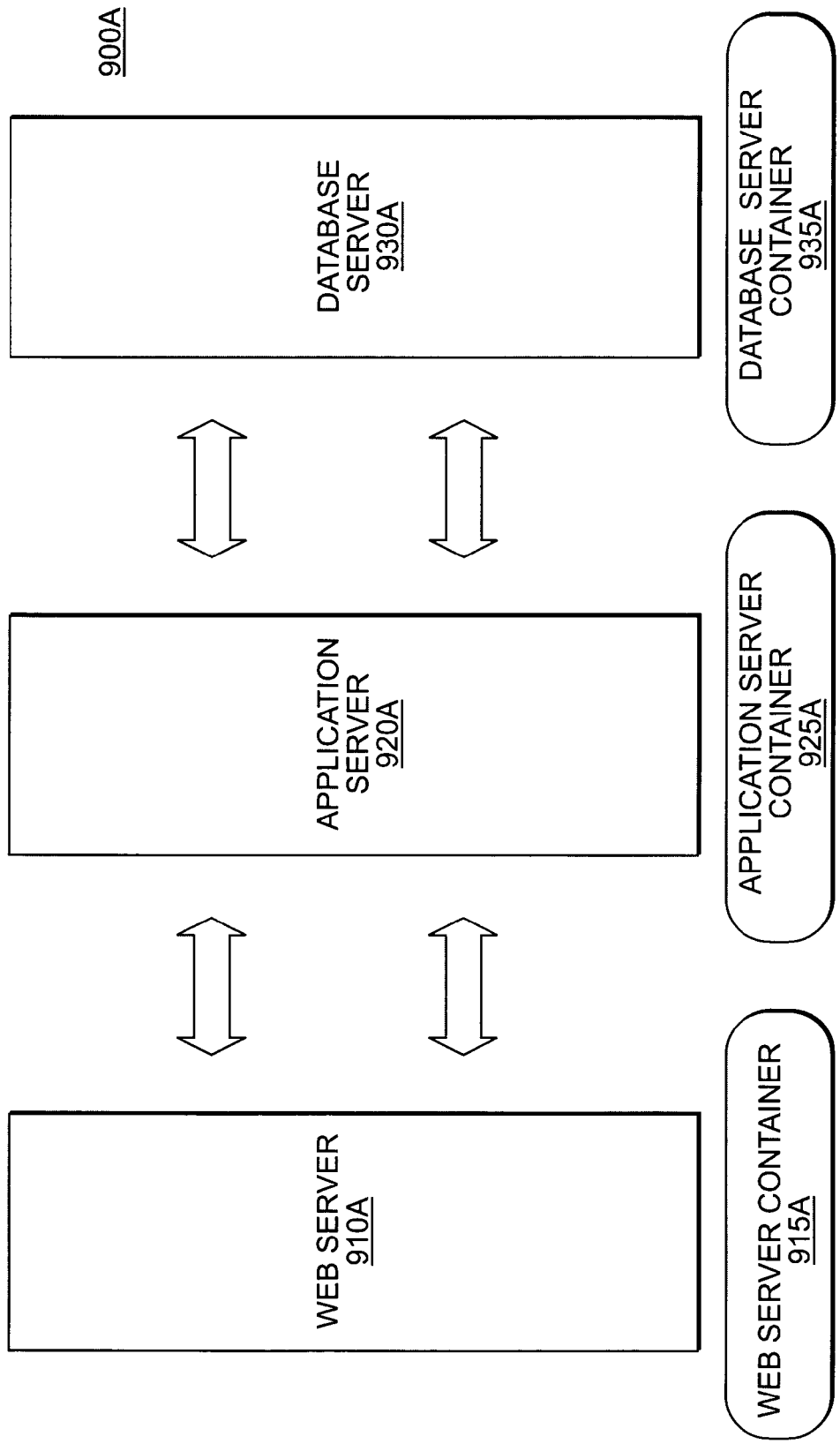

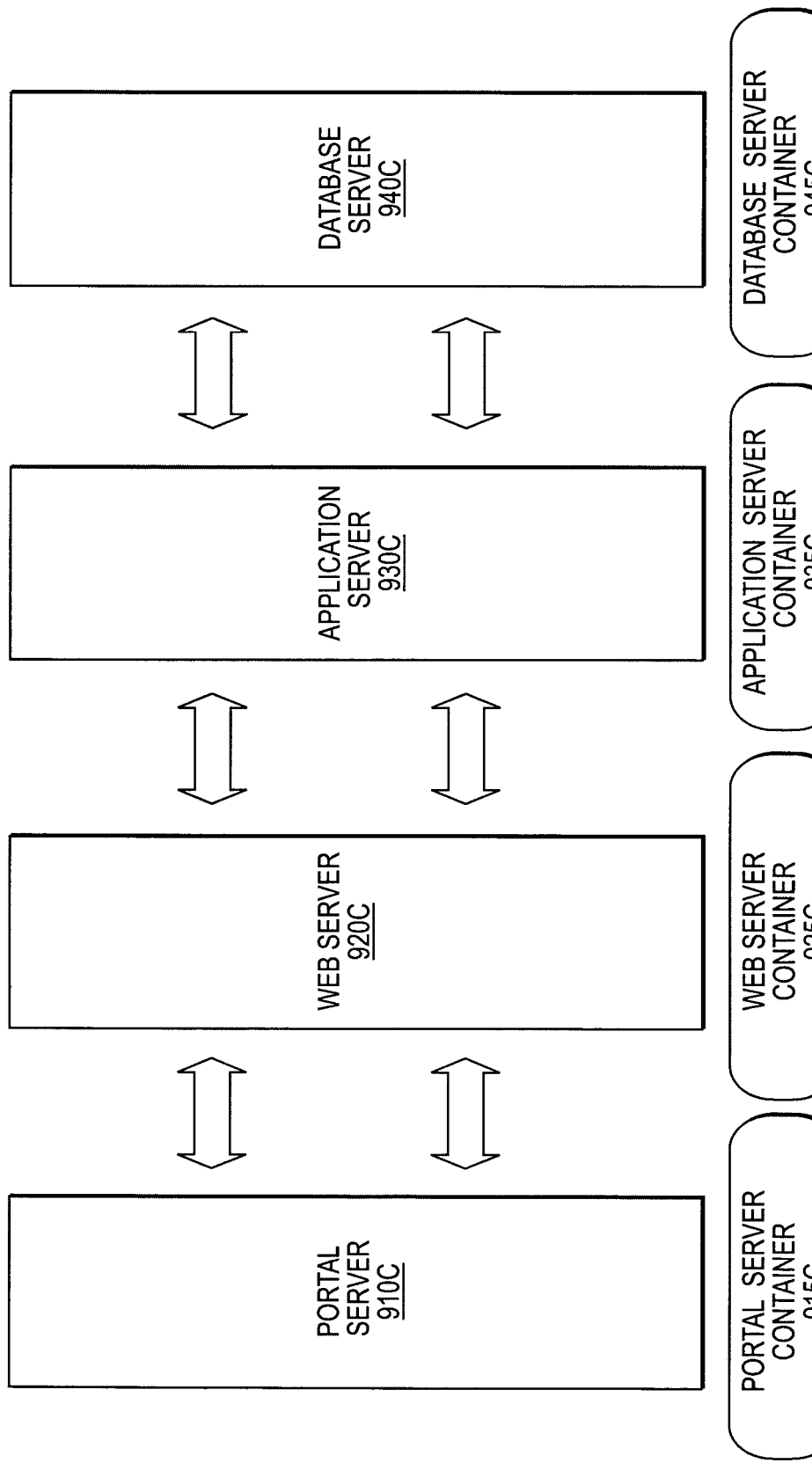

SYSTEMS, METHODS, AND ARTICLES OF MANUFACTURE FOR ALIGNING SERVICE CONTAINERS

FIELD OF THE INVENTION

This invention relates to open network environments and, more particularly, to methods, systems and articles of manufacture for dynamically aligning service containers distributed across a network fabric.

BACKGROUND OF THE INVENTION

The advent and growth of the Internet enable businesses to offer services to an increasing number of distributed customers, partners, employees, and other business entities. Businesses continue to harness various technologies associated with distributed systems to develop and provide these services. One type of technology that is gaining popularity are web services. A web service is a system functionality (e.g., an application, a business service, etc.) that is accessible over the Internet, an Intranet, and even an Extranet using standard web-based protocols (e.g., Hyper Text Transfer Protocol (HTTP)) and extensible Markup Language (XML) interfaces and messages. Accordingly, web services are an ideal way for businesses to provide services in heterogeneous environments where a consumer of a web service may be a user operating a desktop, an application program, or even another web service hosted on any number of different platforms.

Although web service technologies allow businesses to publish and retrieve services through the Internet, problems evolve when trying to customize services for a consumer. Accordingly, smart web services are evolving that understand consumer contexts associated with the services. A consumer context refers to information that a web service needs to know about the consumer to provide customized services. For example, consumer contexts may include, consumer identity, consumer trends associated with the service or related services, consumer location, and other types of consumer profile information.

Because businesses may develop a smart web service using proprietary formats, there exits the problem of sharing these contexts with other services provided by other businesses. To address these sharing problems, business are developing open architectures that include interoperable web services that are designed to work with other web services regardless of the type of tool used to design the service and the type of platform that operates the service. These open architectures typically include servers that host application server containers that provide runtime environments for the services operated within the architecture. Application service containers perform various low level processes, such as resource management, transaction management, state management, and security management, allowing application programmers to focus on high level business processes, such as presentation and authentication logic, etc. The application service containers may use context information associated with users and web services to automatically configure and customize web services offered by the system hosting the containers.

While application service containers aid application developers with creating and maintaining web services, service architectures are also moving toward automating service delivery to optimize efficiency, resource utilization, and availability. Accordingly, developers are contemplating architectures that use system service containers that are designed to aid system developers in administrating web service enterprises. System service containers provide system services that reduce the complexities associated with provisioning services, such as resource change management, problem management, operating system level change management, etc. Using system service containers, new age open net architectures allow system administrators to concentrate on higher level issues, such as overall network and/or storage sizing, managing business rules, etc., rather than focusing on installing, uninstalling, reinstalling, software between hardware based on changes in service requirements.

Therefore, there exits multiple frameworks of technologies that allow businesses to provide context based smart web services and automated system service management that dynamically adjust the capabilities of an architecture's resources to efficiently deliver these services to consumers. Individually, these frameworks provide limited benefits to developers and/or consumers alike. Collectively, however, these frameworks may provide a multitude of benefits that will enable businesses to not only offer context based services, but also dynamically manage the resources that provide these services. Unfortunately, conventional architectures do not have the infrastructure or technologies that effectively align these frameworks together to provide these added benefits.

SUMMARY OF THE INVENTION

Methods and systems consistent with certain aspects related to the present invention provide a container alignment engine that orchestrates the alignment of application and system service containers to provide a distributed environment that automatically manages application and system management services.

In one aspect of the invention, a process is provided for aligning service containers in a system environment. The process may include receiving first event data from an application service container providing application services during runtime of a web service and receiving second event data from a system service container providing system services during runtime of the web service. The process may also dynamically align the system and application services such that a predetermined service level associated with the web service is met during runtime based on at least one of the first and second event data.

In another aspect of the invention, a process is provided for deploying a container alignment environment including service containers distributed across resources in the environment that provides one or more services to a consumer. The deployment process may include defining one or more macro-level service patterns representing predetermined resource configurations in the system environment and defining, based on the defined one or more macro-level patterns, one or more micro-level service patterns representing additional resource configurations within a corresponding macro-level service pattern. Also, the process may involve defining one or more application service metrics associated with an application service container distributed across the resources, and one or more system service metrics associated with a system service container distributed across the resources. In addition to the metrics, the deployment process may also include defining one or more container rules that initiate an action based on a detected event by at least one of the application service container and the system service container, and providing the one or more services to the consumer, such that the one or more container rules are used to maintain a predetermined service level for the one or more services.

Additional aspects of the invention will be set forth in part in the description which follows, and in part will be obvious from the description, or may be learned by practice of the invention.

BRIEF DESCRIPTION OF THE DRAWINGS

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention. In the drawings:

FIGS. 9A-9I are block diagrams of exemplary macro-level service patterns consistent with certain aspects related to the present invention;

DETAILED DESCRIPTION

The following description of embodiments of this invention refers to the accompanying drawings. Where appropriate, the same reference numbers in different drawings refer to the same or similar elements.

Methods, systems, and articles of manufacture consistent with certain aspects related to the present invention provide a container alignment engine that orchestrates the alignment of application and service containers in a distributed environment that dynamically provides customized services. Certain aspects related to the present invention are related to open network architectures that provide context based web services to consumers and dynamically manage the resources that provision these services. Although many different types of web service architectures may be implemented using aspects of the present invention, for exemplary purposes, the functionality of the container alignment features of the present invention are described with respect to a web service architecture based on the Sun® Open Net Environment (ONE) and the N1 system architectures of Sun Microsystems, Inc.

Exemplary Sun ONE Model

Figure 1:
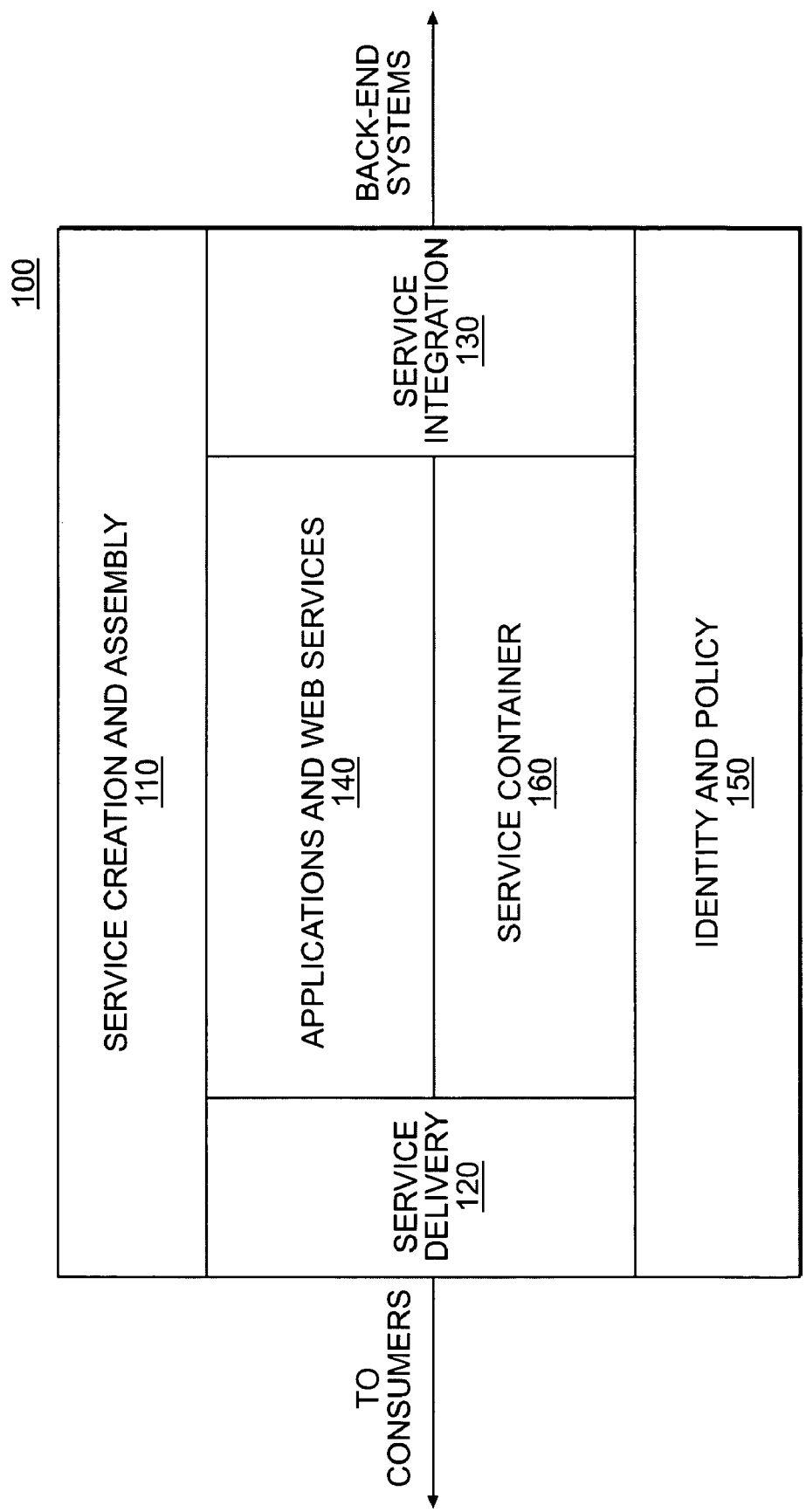
FIG. 1 is a block diagram of an exemplary system model consistent with certain aspects related to the present invention.

The Sun ONE architecture is based on a highly scalable framework that provides services on demand in heterogeneous environments. FIG. 1 is a block diagram of an exemplary model 100 associated with a Sun ONE web service architecture consistent with certain features related to the present invention. As shown, model 100 includes a service creation and assembly block 110, a service delivery block 120, a service integration block 130, an applications and web services block 140, an identity and policy block 150, and a service container block 160.

Service creation and assembly block 110 includes facilities that create discrete services (e.g. micro services) and assembles them into composite services (e.g., macro services). A micro service may represent a service component that produces data (e.g., result data, content information, logic results, etc.) that is specific to a particular type of service. A macro service may represent a courser-grained service that may include one or more micro services. A macro service uses the one or more micro services, business rules, policies, and/or context information to perform business services for a consumer.

Service delivery block 120 includes facilities that provide basic connection, location, discovery, and communication functions for exchanging information with consumers of the services provided by model 100. Service integration block 130 may include facilities that enable services to access other services, internal or external to model 100, and resources, such as databases, files, directories, and legacy applications. Applications and web services block 140 represents the web services and applications that are deployed on any type of platform within model 100. Identity and policy block 150 includes facilities that manage identity, security, and policy functions in model 100.

Service container block 160 represents a runtime environment for the services (e.g., micro and macro services) and provides data persistence and state management functions. Container block 160 may also include process management facilities that manage service workflow and event processing during service provisioning operations. The types of service containers included in service container block 160 may be based on the type of platform used to host the services in block 140. The platform may reside on an operating system or virtual machine that provides access to hardware, storage, networks, etc. For example, the Sun ONE architecture may use a service container based on the Java® 2 Platform Enterprise Edition (J2EE) platform from Sun Microsystems, Inc.

The J2EE platform allows applications to integrate many different types of client applications, such as desktop applications, XML and Hypertext Markup Language (HTML) applications, etc. Further, J2EE applications may integrate backend systems, such as Relational Database Management Systems (RDBMS), Customer Relations Management (CRM) and Enterprise Resource Planning (ERP) systems, etc. The J2EE platform provides standard Application Programming Interfaces (APIs) for XML information that provide features used by the Sun ONE architecture to provide services on demand. Moreover, the J2EE platform minimizes the complexities associated with developing applications development through redeployable components.

Components represent functional software units, such as code written in the Java programming language provided by Sun Microsystems, Inc., that provide standard functions, include APIs, and are easily developed and deployed for specific business purposes, such as those associated with a macro service. Components are assembled into a J2EE application with related object-oriented classes and files, and may communicate with other components. Further, components are installed in particular containers that are the interface between a component and low-level platform specific functionalities that support the component. Accordingly, before a component is executed, it is assembled into a J2EE application and deployed within a specific container. Exemplary components included in the J2EE platform include client components (e.g., application clients, applets, etc.), web components (e.g., Java Servlet and JavaServer Pages® (JSP) components), and business components (e.g., Enterprise JavaBeans® (EJB) components).

Client components run on a client machine and are used to communicate with web and/or business components that are located in a server machine, such as a J2EE server machine. Servlets in a web component are classes that dynamically process requests and generate responses. JSPs are text-based documents that include static content and some programming code that generates dynamic content.

When a JSP is downloaded, a servlet may execute the code in the JSP and generate a corresponding response. Business components include business code (logic) that performs functions associated with particular business domains, such as banking, retail, financing, etc. EJB business components may receive and send data from/to client applications, and accesses and write data from/to an information system tier (e.g., database systems).

There may be different types of containers that are used in a J2EE platform including a web container that manages the execution of JSP and Servlet components (e.g., web components), an EJB container the manages the execution of EJBs for an application (e.g., business components), and an application client container that manages the execution of application client components. Accordingly, containers that support the J2EE components provide standard services, such as web services (e.g., XML registry access, XML data processing, XML, messaging, etc.), communication services (e.g., Remote Method Invocation (RMI) protocols), connection services, and Internet based services. Platforms that conform to the Sun ONE architecture may use J2EE conformant service containers (i.e., an Application Server Containers (ASCs)) that may perform the functions of the service container block 160 in FIG. 1, but also may perform some of the functions associated with service delivery block 120, and service integration block 130.

In one aspect of the invention, an ASC may represent various types of service containers, such as an application service container, a web container, an integration service container, etc., associated with Sun ONE infrastructure architecture solutions including, application servers, portal servers, web servers, integration servers, content management servers, Digital Asset Management (DAM) servers, identity servers, directory servers, etc.

An application server may be configured to manage, develop, and deploy web and application services to consumers. A portal server may be configured to securely deliver information and services to, and receive information from, consumers operating on different platforms. This includes consumers operating wireless devices, desktops, and other machines running different types of operating systems. Web servers may be configured to provide various web-based content and/or information for the services managed by the application server. An integration server is configured to interconnect applications (e.g., legacy and web applications) and services (e.g., smart web services) into a business workflow process to allow the application server to provide a service to a consumer. The integration server may coordinate heterogeneous business applications using business processes that represent how an enterprise is to provide business services to its consumer. The integration server is generally associated with the facilities included in the service integration block 130 of model 100 shown in FIG. 1. The content management server manages the delivery and generation of content that may be used throughout web service enterprise and by various services operating at different platforms. DAM servers are configured to manage the digital rights associated with digital assets, such as music, videos, advertisements, on-line art, etc. An identity server is used by the portal server to enforce access policies and control access to services provided by the enterprise. Further, the identity server may manage access based on roles that are mapped to the polices to configure custom made services for consumers. A directory server may be configured to provide directory services, such as associating attributes with objects to allow efficient access to information maintained in storage, such as Lightweight Directory Access Protocol (LDAP) databases.

An ASC may include virtual pluggable container software units that may be dynamically added, deleted, modified, etc., to automatically provide various application level functionalities. These pluggable units may manage connection pooling, persistence, authentication techniques (e.g., protection of domains within an environment), distributed transactions, messaging, and session and state synchronization functions associated with services and resources that provide the services. Accordingly, an ASC automatically handles the services associated with the above managed functions (e.g., protocol conversion, workflow management, etc.) when service requirements need to be addressed during runtime.

Exemplary N1 Model

The N1 architecture is based on the perspective that a "system" is not simply a combination of processing, memory, network, and storage resources that operate together to support a single application, but rather is a network of such resources that are managed as a single "system." This perspective allows the N1 architecture to manage a multitude of distributed computers, storage systems, and network hardware to deliver services to consumers by defining a fabric operating environment that encompasses all of these resources. The N1 architecture concentrates on managing the deployment of services by dynamically adjusting resource usage based on Service Level Agreements (SLAs), business goals, etc. An SLA is a construct developed by a user (e.g., system developer) that defines a level of service for a corresponding resource (e.g., computer, processing device, etc.).

Figure 2:
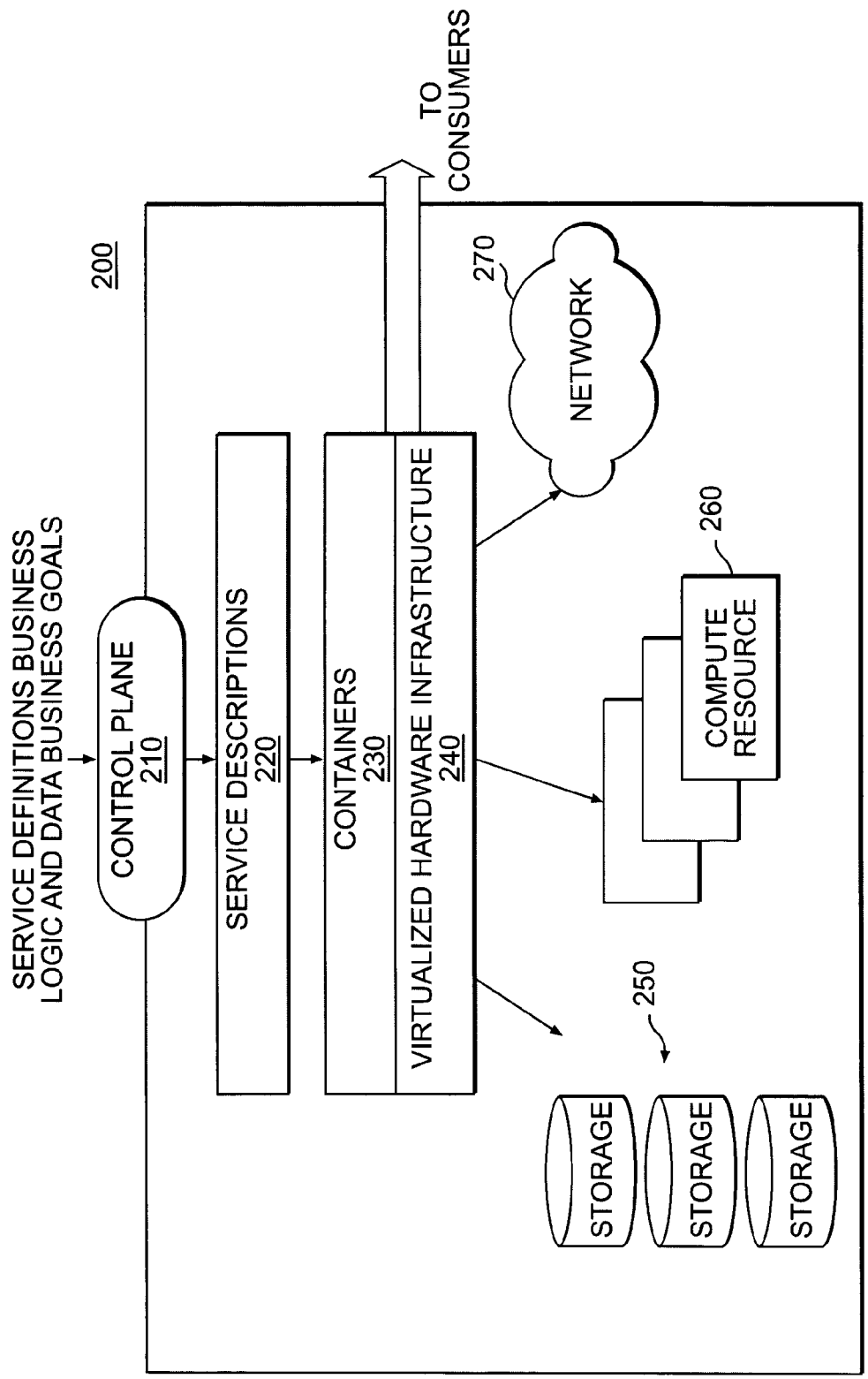
FIG. 2 is a block diagram of another exemplary system model consistent with certain aspects related to the present invention.

FIG. 2 shows a block diagram of an exemplary N1 architecture model 200 consistent with certain aspects of the invention. As shown, model 200 includes a control plane 210, service descriptions 220, containers 230, virtualized hardware infrastructure 240, virtualized software images representing storages 250, compute resources 260, and network 270.

Control plane 210 is a mechanism that translates business objectives into N1 objects. For example, developers provide service definitions, business logic and data, and/or business goals to control plane 210 for translation into objects that the fabric operating environment uses to dynamically provision services that meet the business goals. Service descriptions 220 describe the infrastructure and processes associated with each service provided by the fabric operating environment. Containers 230 host business logic and may operate in hardware-based containers, such as application servers. The fabric operating environment uses its resources to maintain control over each container 230 such that multiple containers running on a single platform meet corresponding service level agreements. Virtualized hardware infrastructure 240 is an abstraction that specifies pools of computing resources connected through one or more networks, including, for example, computing platforms 260, storage systems 250, and network infrastructure elements 270. Storage systems 250 may be associated with virtualized software images that take the form of a software image repository that includes the business logic and container code associated with containers 230.

The fabric operating environment of the N1 architecture is geared toward dynamically maintaining service levels while providing services for consumers. The fabric provisions and deploys the business logic objects and associated containers onto servers and domains (i.e., defined portions of the fabric operating environment including certain resources that provide one or more services). Further, the fabric may automatically configure data and storage networks, initialize metering and monitoring agents, and secure the virtual hardware infrastructure 240 to run the services. Once the services are running, the fabric uses the metering and monitoring agents to monitor the performance of the services against service level agreements. Based on the monitoring, the fabric may dynamically adjust container parameters to keep selected services running within desired service level ranges. Service descriptions associated with service levels that cannot be met are modified by developers such that the corresponding services are reprovisioned to meet the business goals corresponding to these service levels. Accordingly, the N1 architecture allows the fabric to manage resource allocation across an entire pool of compute and storage resources to dynamically allocate, provision, modify, etc. the resources to meet the service level agreements and ultimately, the corresponding business goals defined by the developers.

In one aspect of the invention, the N1 architecture may host many Sun ONE application infrastructure solutions (i.e., application servers, portal servers, web servers, integration servers, content management servers, DAM servers, identity servers, etc.). Collectively, these solutions provide context based services to consumers.

In another aspect of the invention, the containers used by the N1 may be associated with service containers provided by the Solaris® 9 operating environment from Sun Microsystems, Inc. The Solaris 9 operating environment provides resource controls that support multiple service containers on a single server. In one aspect, the N1 containers include System Service Containers (SSCs) that are configured to handle resource management, bandwidth allocation, version/patch maintenance, operating system level change management, service movements, etc. within the N1 fabric, etc. Accordingly, SSCs are essentially virtual computers that collaborate the operations of the virtual compute and storage resources in the N1 fabric.

An SSC may be configured to dynamically adjust the resource relationships in the fabric based on changing service level requirements. The SSC offers management functions at the virtual hardware infrastructure level, such as scalability (e.g., resource connection management, data growth rate management, storage and compute resource capacity management, performance characteristics management, etc.), availability (e.g., platform reliability, etc.), manageability (e.g., resource change management, problem management, asset management, network management, etc.), compatibility (e.g., platform support, back-end connectivity to legacy resources, etc.), security (e.g., application-level security, network security, operating system security, database security, etc.), and adaptability (e.g., extensibility of applications, adaptive nature of compute, storage and network resources based on changing demands from service agreements and infrastructure).

An SSC may be configured to operate based on predetermined rules that allow virtual computing systems to be created within an N1 fabric domain (e.g., a defined portion of the fabric including predetermined resources, containers, infrastructure solutions, etc.), and between domains within and/or outside a physical computing system (e.g., a server machine). An SSC may be configured to understand the types of compute and storage resources required to run one or more ASC's and leverage the virtualization of these resources within a network to extend the resources to any node within the N1 fabric.

Container Alignment Engine

As described, architectures implementing ASC and SSC based technologies may provide high availability of business services and system services. For example, in one aspect of the invention, ASCs hosted on different servers, such as an application server, portal server, identity server, etc. within a fabric operating environment, may provide state, session, and transaction information to a central repository that may or may not be distributed across the nodes of the fabric. The repository may persistently maintain this information for access by any of the ASCs during a failure condition. For example, during failure of two ASCs running a content management engine and DAM engine, respectively, the fabric operating environment may allow alternate ASCs to seamlessly take over the roles of running these engines. Therefore, the fabric provides availability of business services. At the same time, any SSCs supporting the alternate ASCs may determine based on defined SLAs whether to add more resources to support the performance requirements of the SLAs and/or whether to instantiate another SSC/ASC combination on another node to address any degraded performance levels.

One skilled in the art will appreciate that ASCs may act as a congregation point for application/basic services. SSCs may act as the congregation point for system management services. In one aspect of the invention, the orchestrating point for these services is provided by a Container Alignment Engine (CAE). The CAE is a distributed software engine that uses one or more container rules to map the capabilities of the ASCs and SSCs to dynamically manage application and system level functions in a service provisioning environment. This may also be referred to as "aligning" containers. The CAE takes into account the location of services within a fabric operating system to address security, scalability, and resiliency issues associated with resources providing the services.

Figure 3:
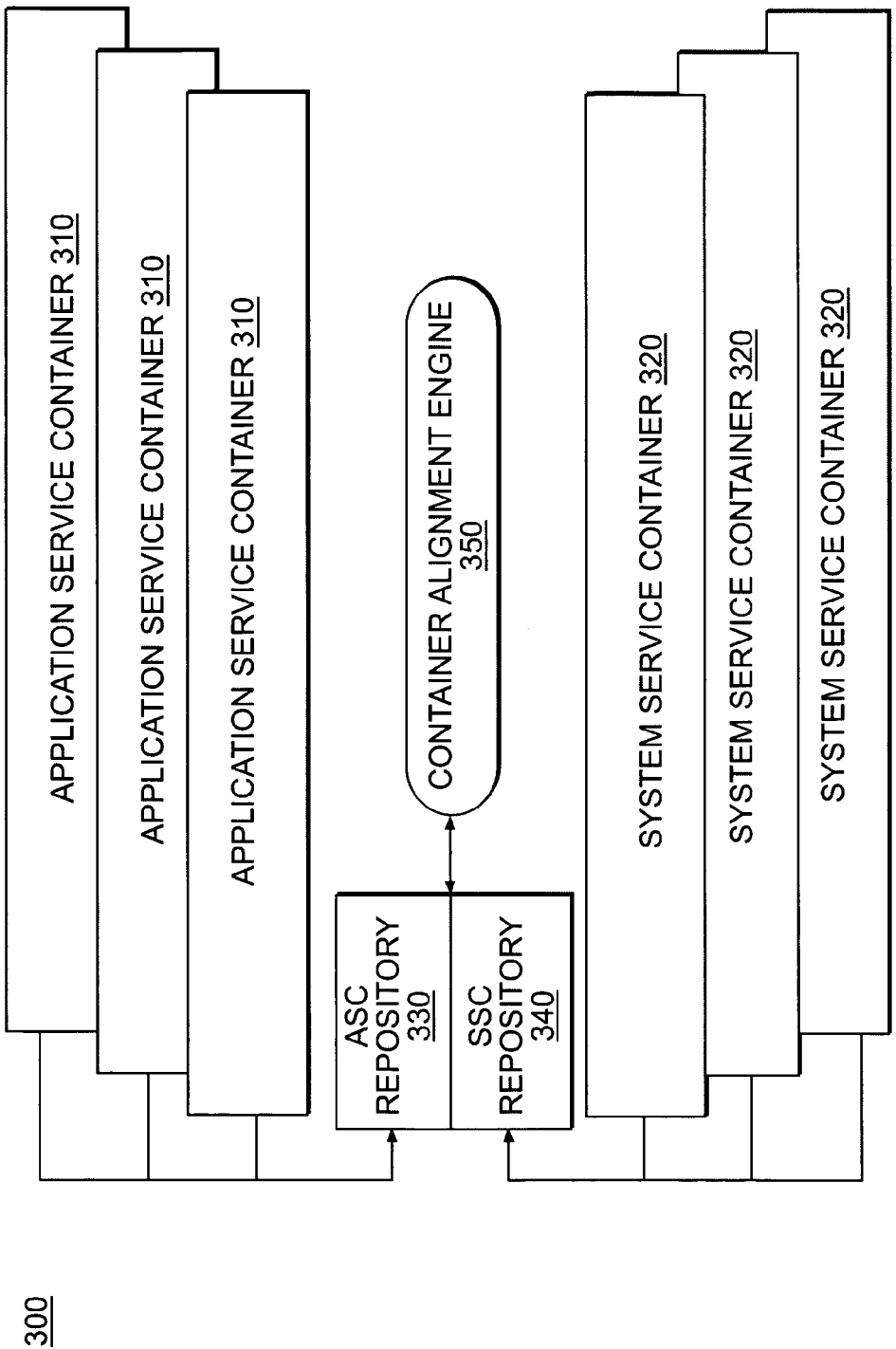
FIG. 3 is a block diagram of an exemplary container alignment engine system model consistent with certain aspects related to the present invention.

FIG. 3 shows a block diagram of an exemplary CAE environment 300 consistent with certain aspects related to the present invention. As shown, environment 300 includes one or more ASCs 310, one or more SSCs 320, an ASC repository 330, an SSC repository 340, and a CAE 350.

ASCs 310 represent one or more application service containers that are distributed throughout a fabric operating environment on one or more servers, such as application servers, integration servers, identity servers, etc. SSCs 320 represent one or more system service containers that are also distributed throughout the fabric operating environment on one or more servers, such as application servers, integration servers, database servers, etc. In one aspect of the invention, ASC 310, and/or SSC 320, may represent a virtual container that is distributed a/cross multiple servers. For example, ASC 310 may represent a collection of ASCs running on many different types of servers, such as application servers, web servers, integration servers, etc.

ASC repository 330 represents a data store that receives and maintains event data generated and/or provided by ASCs 310. In one aspect of the invention, the event data may be associated with business related metrics corresponding to the performance of one or more running services. The event data may also be metrics associated with Service Level Agreements (SLAs), resource, connect, cluster (more than one computing element), and/or storage attributes associated with resources within the fabric operating environment.

On the other hand, SSC repository 340 represents a data store that receives and maintains event data generated and/or provided by SSCs 320, such as system management metrics associated with one or more resources running one or more services including resource attributes, change management attributes, communication attributes, cluster attributes, and storage attributes. Although FIG. 3 shows ASC and SSC repositories 330, 340 as separate elements, one skilled in the art will appreciate that the repositories may be combined into a single data store repository. Further, repositories 330, 340 may represent distributed repositories associated with each ASC 310 and/or SSC 320.

CAE 350 represents a software engine that may be distributed among several resources in the fabric network operating environment that enforces rules based on the event data stored in ASC and SSC repositories 330 and 340, respectively. The rules may be based on events, triggers, thresholds, container dependencies, time stamp information, etc. CAE 350 aligns one or more ASCs required to run a service, or an application delivering services on demand, with one or more SSCs. Aligning containers may refer to associating one or more ASCs with one or more SSCs such that the services provided by each of these containers may be used by resources, software, and other processes. Accordingly, realigning containers may refer to adjusting the container associations to modify the services, performance, capabilities, etc. of the resources, software, processes, provided by the originally alignment. Further, aligning containers may refer adjusting the association (e.g., the distribution) of one or more types of a container, such as a single SSC, within a system environment. For example, an exemplary SSC 320 may be distributed among four servers that operate with four CPUs each. CAE 250 may realign the exemplary SSC 320 such that it is distributed across eight similar servers, thus increasing processing capabilities from sixteen CPUs to thirty-two.

In one aspect of the invention, CAE 350 may align the ASCs with SSCs based on a set of application infrastructure deployment scenarios (i.e., macro services patterns) that the fabric operating environment may have defined through control plane 210. Following the selection of the macro services patterns, the environment may determine one or more micro services patterns based on the features and capabilities of the application infrastructure solutions (i.e., the various servers implemented in the environment, such as application servers, identity servers, integration servers, web servers, proxy servers, portal servers, directory servers, etc.).

CAE 350 may provide many different scenarios of alignment between the ASCs 310 and SSCs 320 within the fabric operating environment. CAE 350 may align these containers based on the type of sub-environment within the fabric (e.g., domains, etc.). For example, within a particular domain in the fabric, CAE 350 may align one ASC 310 to one SSC 320 (e.g., one integration server container running on one SSC), multiple ASCs 310 to one SSC 320 (e.g., multiple web containers to one SSC), and one ASC 310 to two or more SSCs 320 (e.g., application server cluster to two or more SSCs). For alignment between boxes, (i.e., a physical or virtual-based system hosting one or more resources), CAE 350 may align multiple ASCs 310 to one SSC 320 (e.g., a web server cluster implemented within a SSC), one ASC 310 to multiple SSCs 320 (e.g., multiple databases supported by a clustered SSC), and multiple ASCs 310 to multiple SSCs 320 (e.g., multiple database server containers and LDAP replicas (i.e., backup LDAP servers) on a SSC cluster).

In scenarios of alignment when a network is defined as a box, CAE 350 may align may ASCs 310 to one SSC 320, one ASC 310 to many SSCs 320, and two or more ASCs 310 to two or more SSCs 320. These and other features associated with the operations of the CAE 350 are described below.

Exemplary CAE System Architectures

Figure 4:
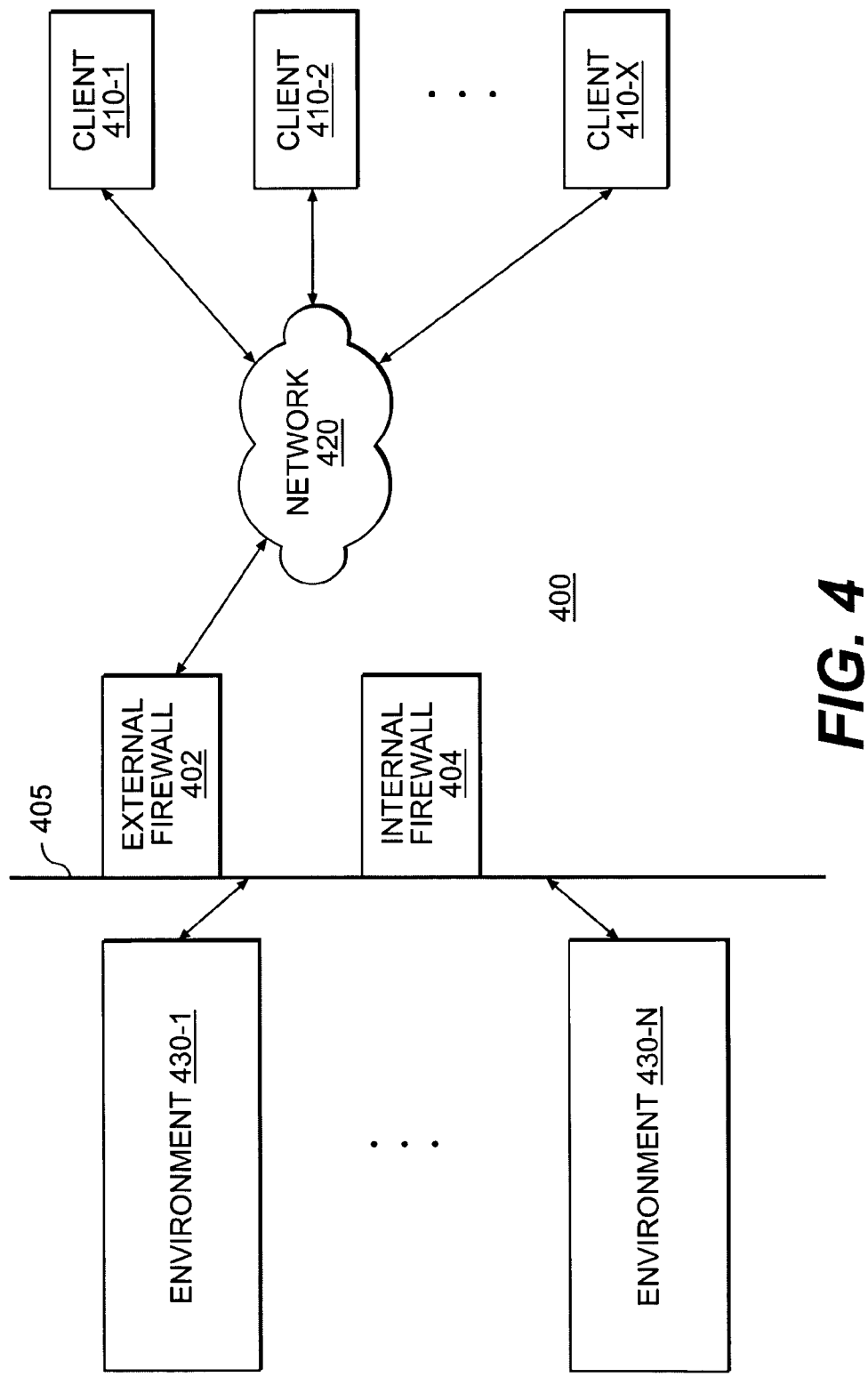
FIG. 4 is a block diagram of an exemplary system environment consistent with certain aspects related to the present invention.

As described, the CAE may be distributed among one or more resources included in a fabric operating environment. FIG. 4 shows an block diagram of an exemplary system environment 400 consistent with certain aspects related to the present invention. As shown, system environment 400 includes a communication link 405, external and internal firewalls 402 and 104, respectively, one or more clients 410-1 to 410-X (X being an integer greater than 1), network 420, and one or more environment 430-1 to 430-N (N being an integer greater than 1).

Communication link 405 may represent a network, such as Local Area Network (LAN), an Extranet, an Intranet, and any other type of network or combination of networks that facilitate the exchange of information to and from certain entities in system environment 400.

External firewall 402 may represent a processing system or software construct that controls access between communication link 405 and network 420. For example, external firewall 402 may be a single computing system, such as a server, or software distributed across several servers, that control access to communication link 405 or network 420 based on one or more security rules, policies, etc. associated with fabric 400. Internal firewall 104 may represent a processing system or software construct that controls access between entities located (virtually or physically) on either side of internal firewall 404. For example, internal firewall 404 may be one or more computing systems (e.g., servers) or software distributed across one or more computing systems, that control access between environment 430-N, environment 430-1, and/or external firewall 402 based on security rules, policies, etc. defined for system environment 400.

Clients 410-1 to 410-X may each represent any type of known computing system that is configured to request and receive information from entities attached to network 420. For example, clients 410-1 to 410-X may represent a desktop computer system, a server system, a Personal Digital Assistant (PDA), a wireless telephone, etc. Clients 410-1 to 410-X may include processing devices and supporting devices that allow a user to request and receive the information from network 420. In one aspect of the invention, clients 410-1 to 410-X may be configured as a J2EE platform client machine that includes client components, such as application clients, a web browser, applets, JavaBeans components, etc. that manage the flow of data between components running on a J2EE server machine. Clients 410-1 to 410-X may be configured as consumers of web services provided by resources included in system environment 400.

Network 420 may represent one or more networks that facilitate the exchange of information between entities included in system environment 400, such as clients 410-1 to 410-X and environments 430-1 to 430-N. For example, network 420 may be the Internet, an Extranet, and Intranet, or any other type of network, or combination of networks, that facilitate the exchange of information through various types of protocols, such as Simple Object Access Protocol (SOAP), Hyper Text Transfer Protocol (HTTP), etc.

Environments 430-1 to 430-N may each represent a collection of system resources that individually, or collectively, process information and provide one or more services to a consumer (e.g., clients 410-1 to 410-X). The system resources may include one or more servers, gateway devices, multiplexer devices, databases, network devices, message queue devices, etc. arranged in various configurations. For example, the system resources may include one or more application infrastructure solutions, such as a certificate server, calendar server, content server, caching server, messaging transaction server, application server, web server, integration server (Business-to-Business (B2B) and/or Enterprise Application Integration (EAI)), web proxy server, database server, reporting server, directory server, security server, mail server, mobile application server, portal server, SOAP server, DAM server, etc.

One or more environments 430-1 may be positioned between external firewall 402 and internal firewall 404. Also, one or more environments (e.g., environment 430-N) may be positioned behind internal firewall 404. Accordingly, the flow of information between environments 430-1 to 430N may be controlled by internal firewall 404, while the flow of information between environments 430-1 to 430-N and entities connected to network 420 are controlled by external firewall 402.

Figure 5:
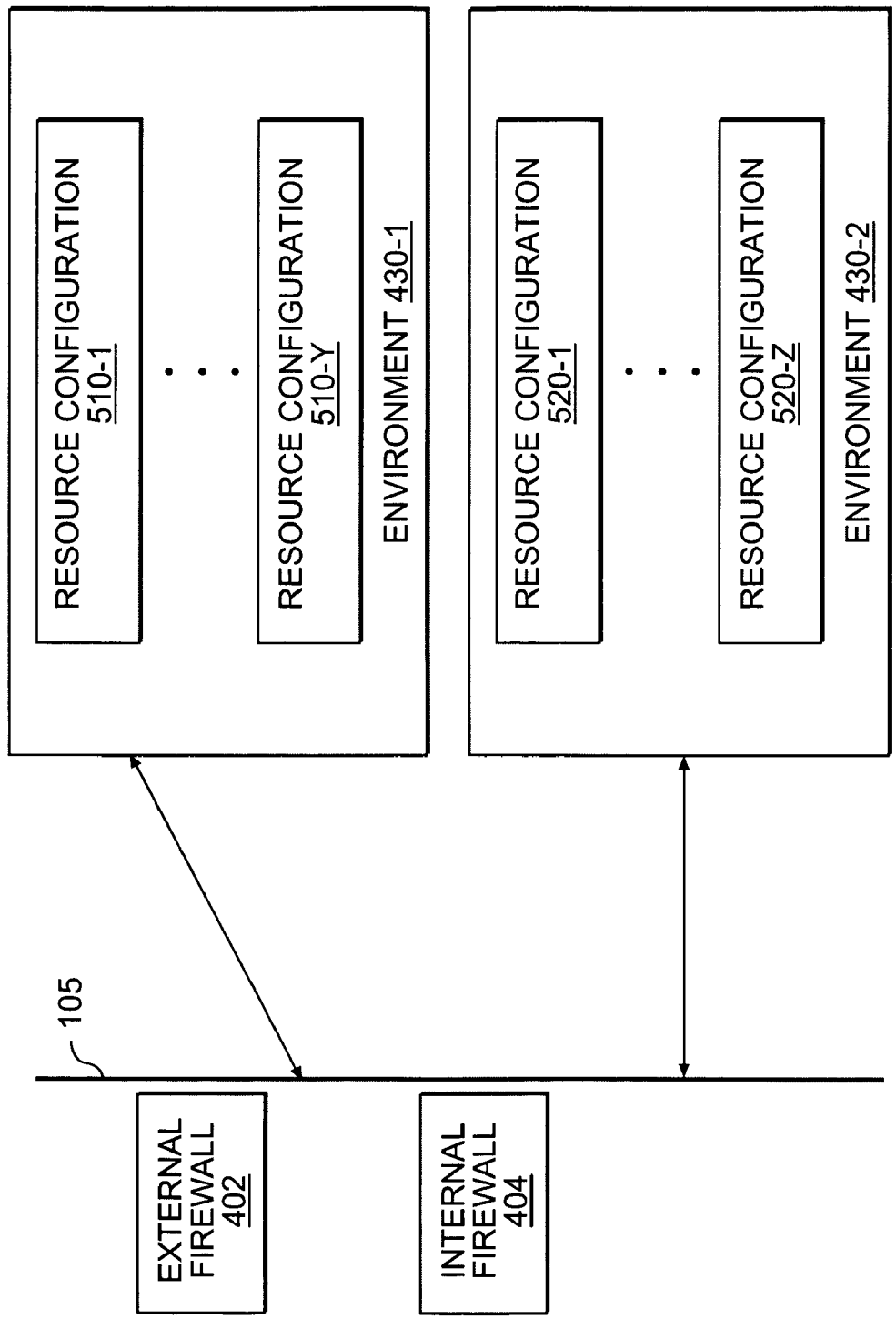
FIG. 5 is a block diagram of exemplary environments included in the system environment shown in FIG. 4, consistent with certain aspects related to the present invention.

FIG. 5 shows a block diagram of exemplary environments 430-1 to 430-N consistent with certain embodiment related to the present invention. As shown, environment 430-1 is positioned between external and internal firewalls 402 and 404, respectively, and environment 430-2 is positioned behind internal firewall 404. Exemplary environments 430-1 and 430-2 may each include one or more resources configurations consistent with various aspects related to the invention. For example, environment 430-1 may include one or more resource configurations 510-1 to 510-Y (Y being an integer greater than 1) and environment 430-2 may include one or more resource configurations 520-1 to 520-Z (Z being an integer greater than 1). A resource configuration is configuration of resources (e.g., servers, databases, network devices, etc.).

Figure 6:
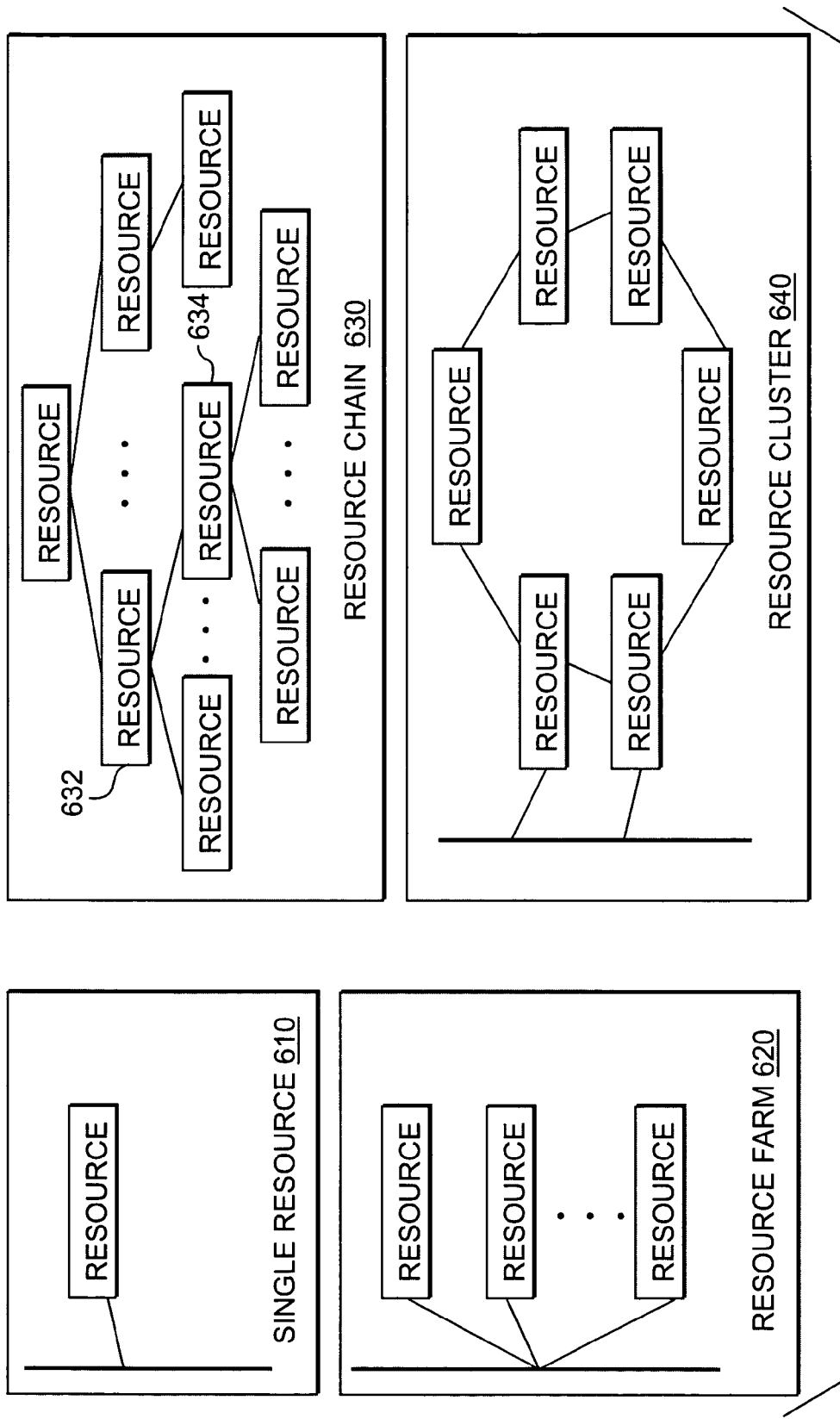
FIG. 6 shows block diagrams of various resource configurations consistent with certain aspects related to the present invention.

The types of resource configurations 510 and 520 included in environments 430-1 and 430-2 may vary. FIG. 6 shows some exemplary resource configurations that may be implemented by environments 430-1 and 430-2. As shown, the resource configurations included in environments 430-1 and 430-2 may represent a single resource 610, a resource farm 620, a resource chain 630 and/or a resource cluster 640.

While single resource configuration 610 includes a single resource, a resource farm 620 represents a plurality of similar (or different) resources that individually, or collectively, provide functions and/or services consistent with certain aspects related to the present invention. A resource chain 630 may be a configuration of similar (or different) resources that have a virtual and/or physical hierarchy arrangement. For instance, an upper level resource (e.g., resource 632) may control or manage access and/or processing of information to and from a lower level resource in its respective chain (e.g., resource 634). A resource cluster 640 may be an arrangement of similar (or different) resources in a virtual or physical loop.

The resources included in the resource configurations may be similar or different types of resources (e.g., servers, databases, etc.). For example, one or more resources included in a resource configuration may represent a master or primary resource while one or more other resources included in the same configuration may represent back-up, slave, or redundant resources to the master or primary resource. Further, one skilled in the art will appreciate that environments 410-1 to 410-2 are not limited to the resource configurations shown in FIG. 6 and that different combination and other types of configurations may be implemented without departing from the scope of the present invention.

Figure 7:
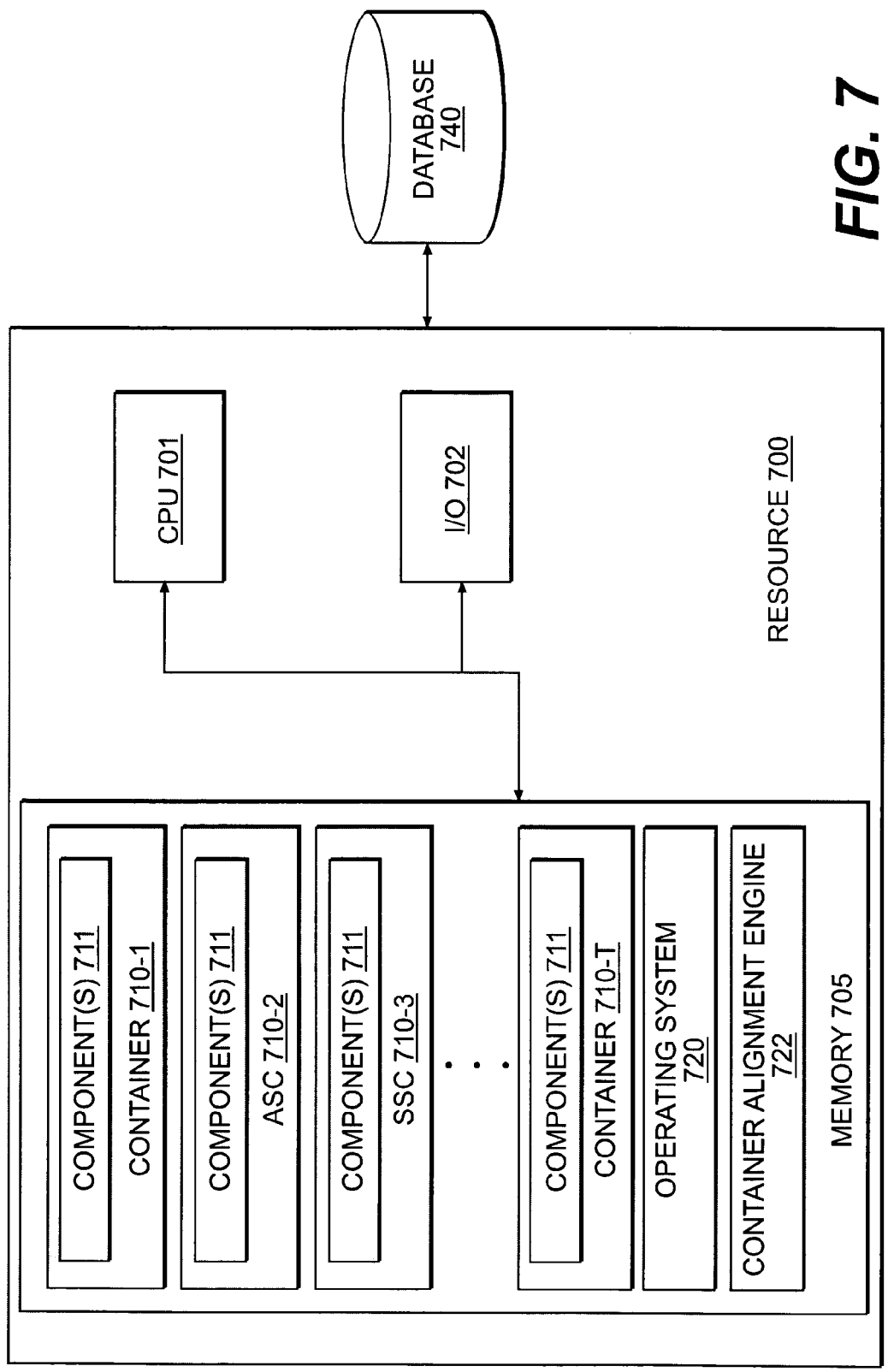
FIG. 7 is a block diagram of an exemplary system resource consistent with certain aspects related to the present invention.

As described, the resources included in environments 430-1 to 430-N may include different types of resources, such as the application infrastructure solutions described above. For example, a resource may be an application server, calendar server, content server, caching server, messaging server, transaction server, application server, web server, B2B server, EAI server, web proxy server, database server, reporting server, directory server, security server, mail server, mobile application server, portal server, CORBA server, SOAP server, and a media server. In one aspect of the invention, some of the resources include a server configured as a J2EE platform server implemented in an open network architecture, such as the Sun One and/or N1 architectures described above. FIG. 7 shows an exemplary server resource 700 consistent with certain aspects related to the present invention. As shown, resource 700 includes a CPU 701, Input/Output (I/O) device, 702, and memory device 705.

CPU 701 may be one or more known processing devices configured to access, manipulate, and/or execute data and/or software stored in memory 705. I/O device 702 may be one or more interface devices configured to facilitate the exchange of data between software and/or hardware entities included in, or external to, resource 700. Memory 705 may be one or more memory devices that store data and software used by CPU 701 to perform one or more functions particular to the type of resource 700. For example, in one aspect of the invention, memory 705 may include one or more containers 710-1 to 710-T (T being an integer greater than 1), operating system software 720, and CAE 722.

Containers 710-1 to 710-T may represent various types of software based containers, such as J2EE compliant containers (e.g., web containers, business containers, etc.). Each container 710-1 to 710-T may include one or more components 711 that may be various types of components associated with the type of container 710-1 to 710-T hosting the components 711, such as web components, business components, etc. In one aspect of the invention, memory 705 may include an ASC 710-2 and SSC 710-3 similar to the ASCs and SSCs described above with respect to the Sun ONE and N1 architectures. ASC 710-2 and SSC 710-3 may provide event data to repository 740 during runtime when resource 700 and/or system environment 400 is delivering one or more services to one or more consumers (e.g., clients 410-1 to 410-X). Repository 740 may represent one or more databases that is accessible by one or more of the resources included in a single environment (e.g., environment 410-1) or multiple environments (e.g., environments 410-1 and 410-2).

Operating system software 720 represents any type of operating system code associated with the type of platform hosting resource 700. In one aspect of the invention, operating system software 720 includes programming code based on the Solaris 9 operating system provided by Sun Microsystems, Inc, although any type of operating system that provides functionalities similar to those related to certain aspects of the invention may be implemented, such as providing service containers for managing services in system environment 400.

Deploying a CAE Environment

Figure 8:
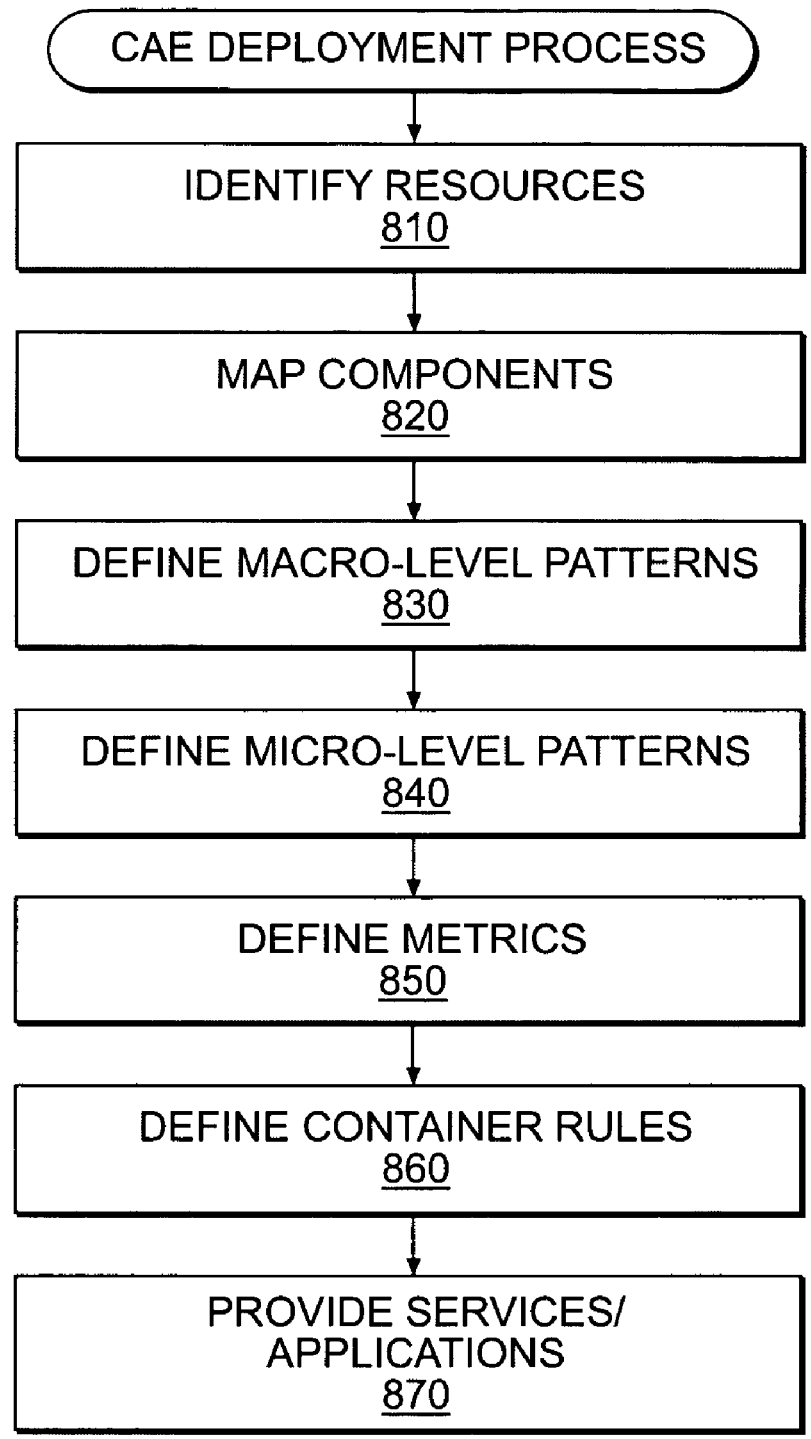
FIG. 8 is a flowchart of an exemplary CAE deployment process consistent with certain aspects related to the present invention.

As previously mentioned, a container alignment engine (CAE) consistent with aspects of the present invention may be distributed among one or more resources included in system environment 400. Accordingly, CAE 722 may represent a distributed portion of the alignment engine running in exemplary resource 700. CAE 722 may operate concurrently with other CAEs 722 running in other resources 700 to align ASCs 710-2 with SSCs 710-3 within system 400 to provide one or more context-based services to consumers. Further, CAE 722 may apply one or more container rules based on the event data stored in repository 740 to dynamically tune the enterprise of resources providing these services (e.g., adjust the performance of network environment 400). FIG. 8 is a flowchart of an exemplary CAE deployment process consistent with certain aspects related to the present invention. It should be noted that CAE 722, as described herein, may represent one or more of the CAEs 722 running in the one or more resources within environments 430-1 to 430-N.

As shown, system environment 400 may be configured to deploy a CAE environment by identifying the types of software and hardware components that make up the resources in system environment 400 (Step 810). For example, a user (e.g., system developer, service developer, etc.) or a software-based process (e.g., expert system, CAE 722, etc.) may generate a data structure (e.g., a file, data array, etc.) of known resources included in system environment 400 that provide services consistent with certain aspects related to the present invention. In one configuration, the user may determine the types of resources required to provide each service offered by system environment 400 based on one or more SLAs and/or service descriptions provided to one or more control planes (e.g., control pane 210) associated with system environment 400. For instance, the user may determine that a multi-media/mobile web service may be built on various types of resources, such as a web server, portal server, application server, content management server, DAM server, a SOAP server, a database server, a Business-to-Business (B2B) server, an EAI server, a directory server, identity server, and a mobile application/Wireless Access Protocol (WAP) server. Other types of resources may be identified for other types of services, such as a certificate server, calendar server, a caching server, a messaging server, a transaction server, a web proxy server, a reporting server, a security server, and a mail server.

Further, the CAE deployment process may include mapping one or more components each identified resource uses to build the services offered by system environment 400 (Step 820). For example, a user or a software process (e.g., CAE 722) may map a certificate server to signature components, an application server (e.g., a Sun ONE application server) to EJB components, and a directory server (e.g., a Sun ONE directory server) to Java Naming and Directory Interface (JDNI) components. The mapped information may be stored in a database as template information used by the CAE deployment process to define one or more service patterns.

For example, based on the identified resources and mapped components, the CAE deployment process allow a user or a software-based process (e.g., CAE 722) to define one or more macro level service patterns (Step 830). A macro level service pattern represents a configuration of computing devices (e.g., resources) that may be defined by a user, such as a service developer, system administrator. Alternatively, a macro level service pattern may be defined by an automated process, such as an expert system, that uses a knowledge database of known resource configurations to maximize the performance of the resources under certain operating conditions. FIGS. 9A-9I are block diagrams of nine exemplary macro-level service patterns that may be created for various types of web services and/or applications provided by system environment 400.

FIG. 9A shows an exemplary macro-level service pattern 900A associated with a web application in a three-tier system including a web server 910A, application server 920A, and a database server 930A. Each server is associated with a corresponding service container 915A, 925A, and 935A, and corresponding mapped components. For example, the components deployed in exemplary service pattern 900A include JSP, Servlets, EJB, JDBC, and Message Driven Beans (MDB) components.

Figure 9B:
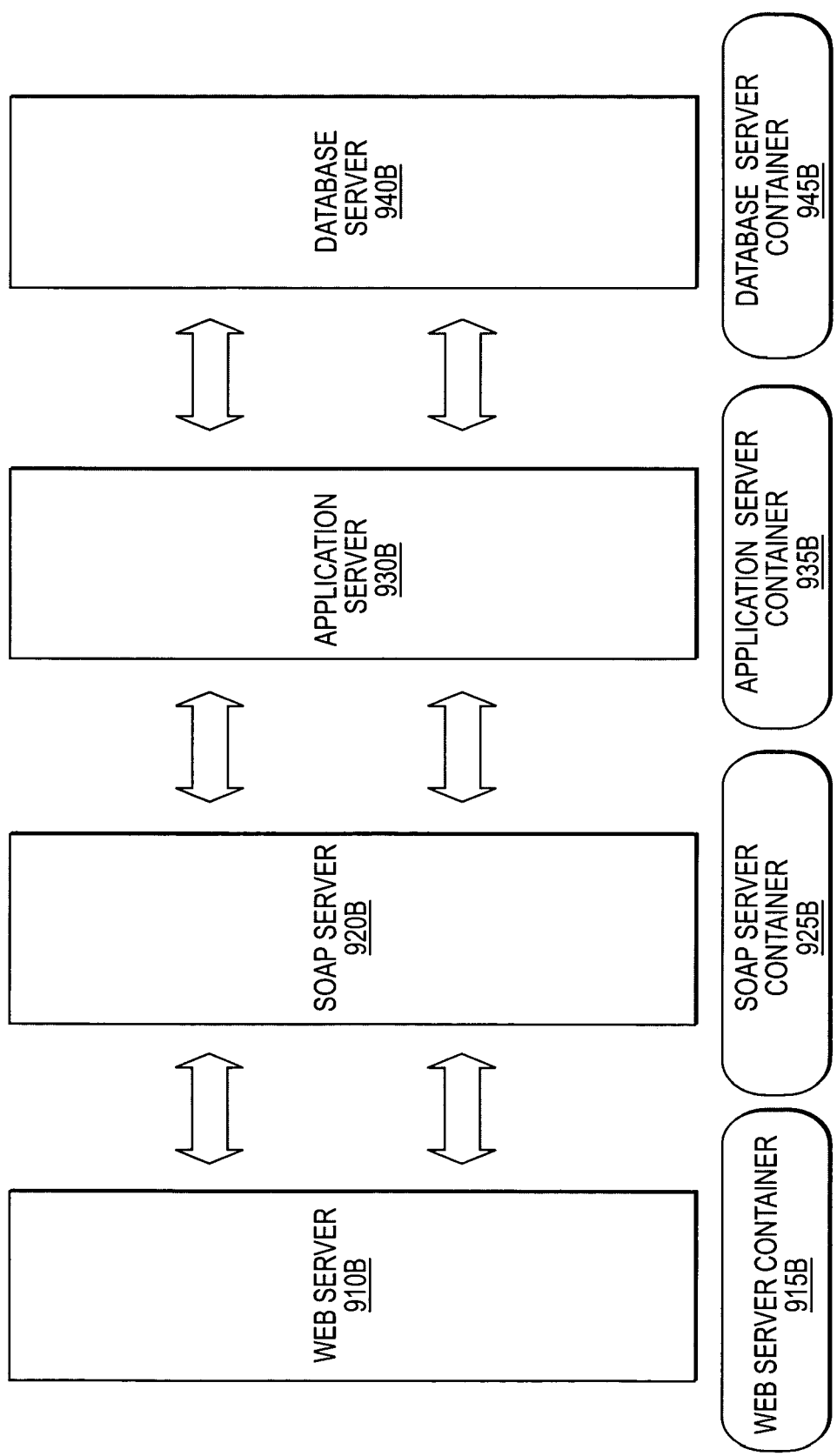

FIG. 9B shows an exemplary macro-level service pattern 900B associated with a web service in a multi-tier system including a web server 910B, SOAP server 920B, application server 930B, and a database server 940B. Each server is associated with a corresponding service container 915B, 925B, 935B, and 945B, and corresponding mapped components. For example, the components deployed in exemplary service pattern 900B include JSP, Servlets, SOAP, XML, EJB, JB, JDBC, and MDB components.

FIG. 9C shows an exemplary macro-level service pattern 900C associated with a web application via a portal server in a multi-tier system including a portal server 910C, web server 920C, application server 930C, and a database server 940C. Each server is associated with a corresponding service container 915C, 925C, 935C, and 945C, and corresponding mapped components. For example, the components deployed in exemplary service pattern 900C include portlets (e.g., components configured to process portal operations with consumers), netlets (components configured to process network transactions), JSP, Servlets, EJB, JB, JDBC, an D components.

Figure 9D:
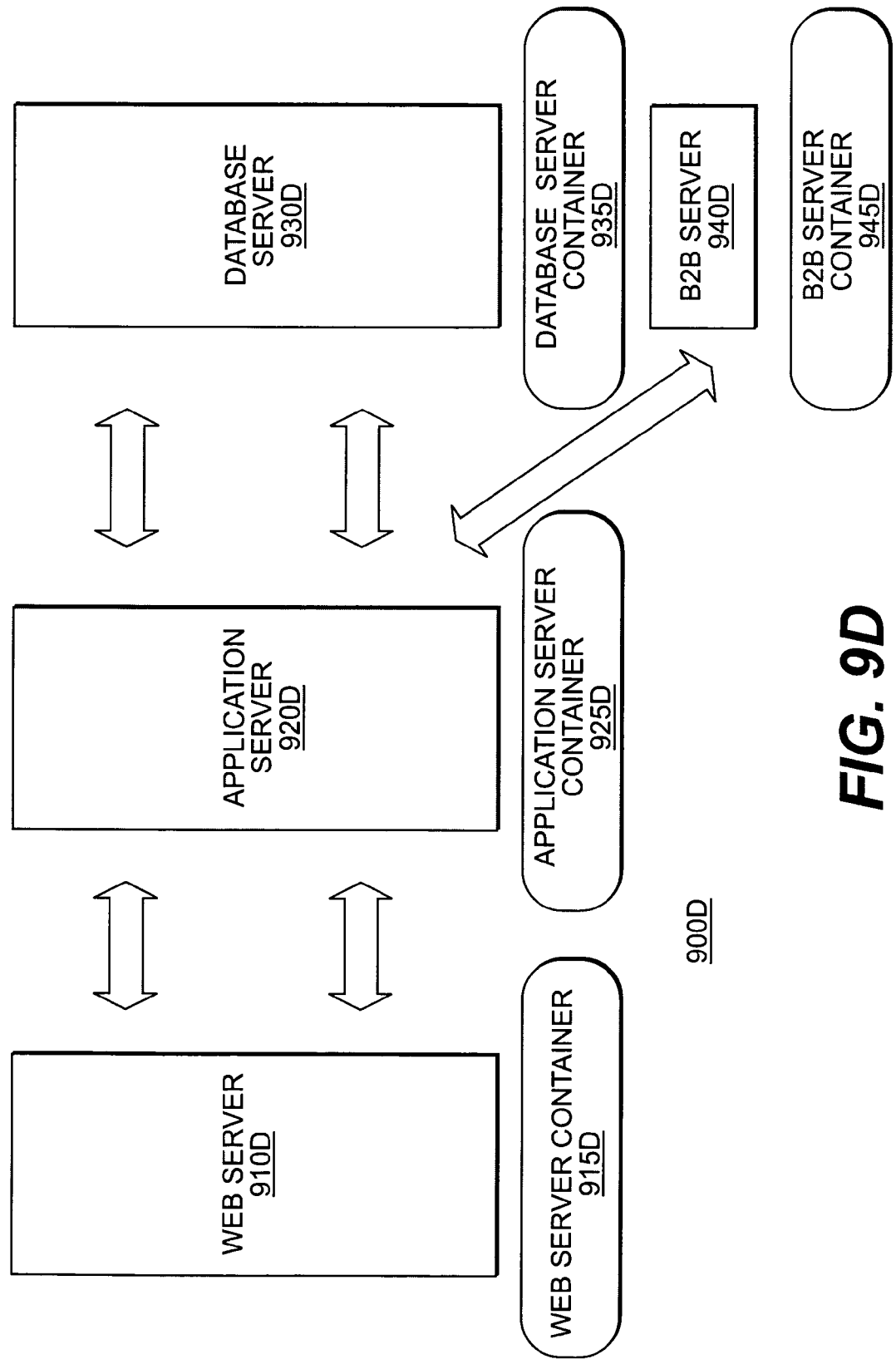

FIG. 9D shows an exemplary macro-level service pattern 900D associated with a web application with a B2B pattern in a multi-tier system including a web server 910D, application server 920D, database server 930D, and a B2B server 940D. Each server is associated with a corresponding service container 915D, 925D, 935D, and 945D, and corresponding mapped components. For example, the components deployed in exemplary service pattern 900D include JSP, Servlets, XML, Java Message Service (JMS), Java Transaction Service (JTS), Java Cryptography Architecture (JCA), EJB, JB, and JDBC, components.

Figure 9E:
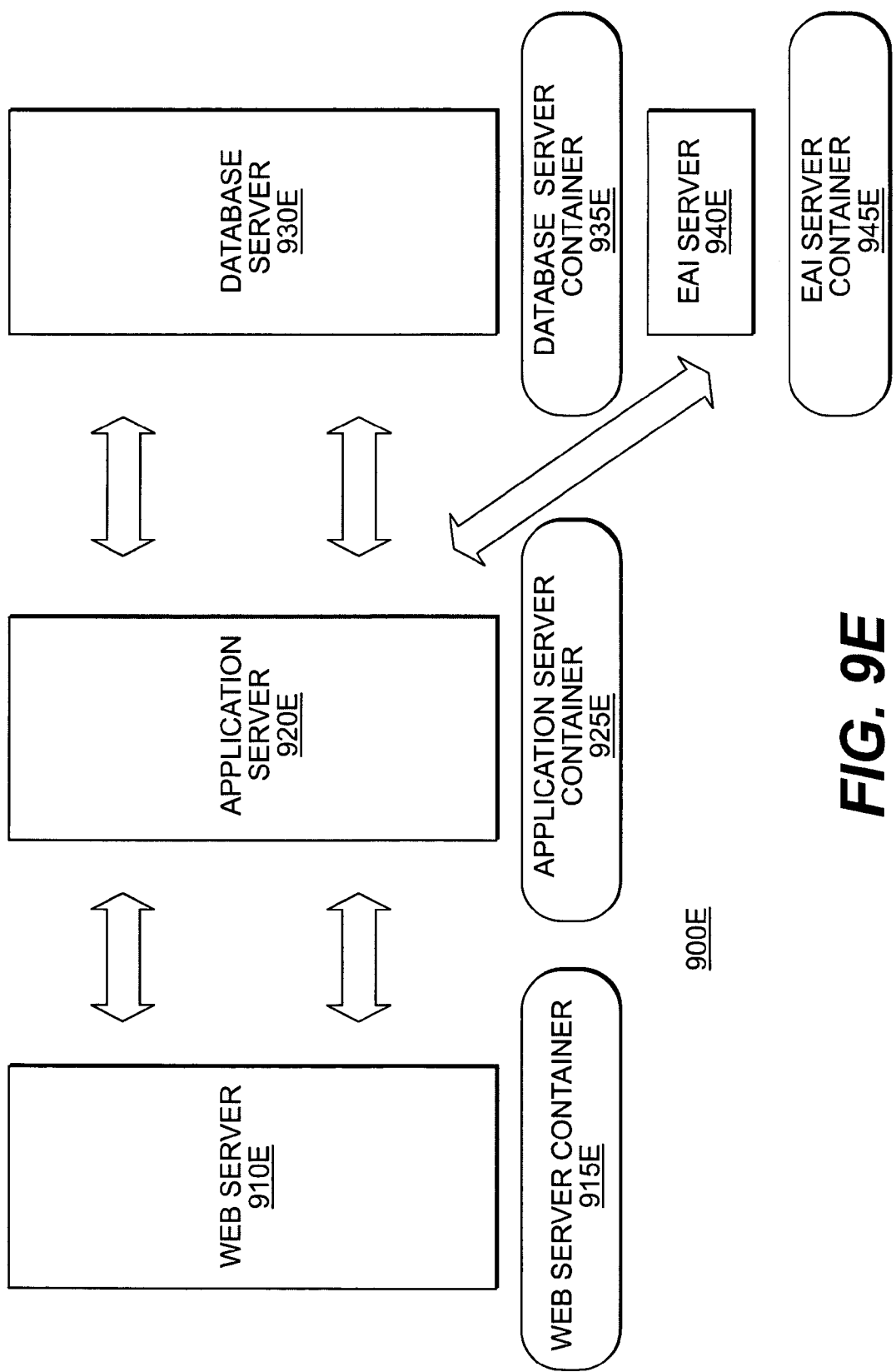

FIG. 9E shows an exemplary macro-level service pattern 900E associated with a web application with an EAI pattern in a multi-tier system including a web server 910E, application server 920E, database server 930E, and an EAI server 940E. Each server is associated with a corresponding service container 915E, 925E, 935E, and 945E, and corresponding mapped components. For example, the components deployed in exemplary service pattern 900E include JSP, Servlets, EJB, JB, MDB, JMS, JTS, JCA, ERP adapters, and MDB components.

Figure 9F:
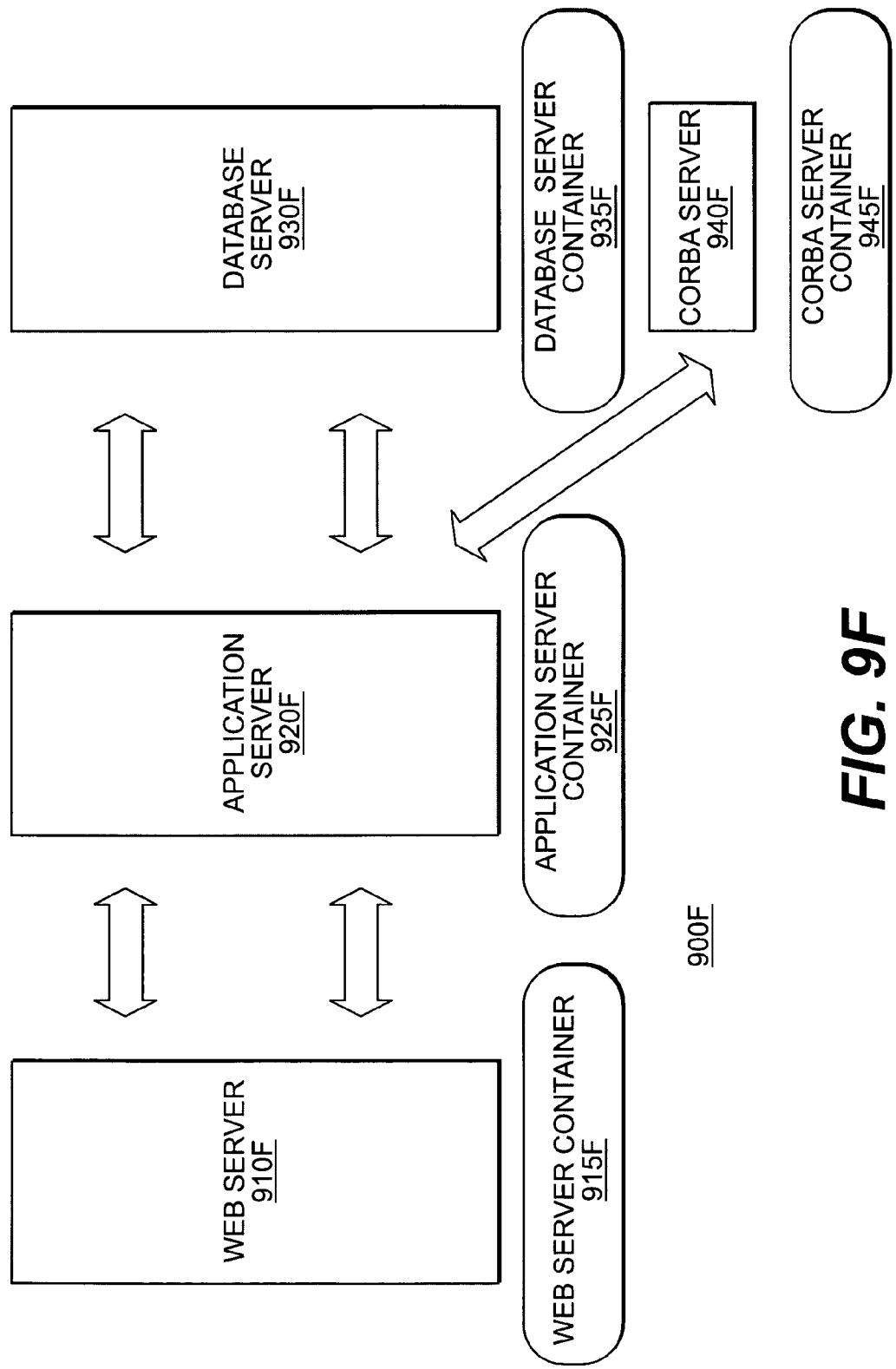

FIG. 9F shows an exemplary macro-level service pattern 900F associated with a web application with a CORBA server pattern in a multi-tier system including a web server 910F, application server 920F, database server 930F, and a CORBA server 940F. Each server is associated with a corresponding service container 915F, 925F, 935F, and 945F, and corresponding mapped components. For example, the components deployed in exemplary service pattern 900F include JSP, Servlets, EJB, JB, MDB, JavaIDL, ORB, and JDBC components.

Figure 9G:
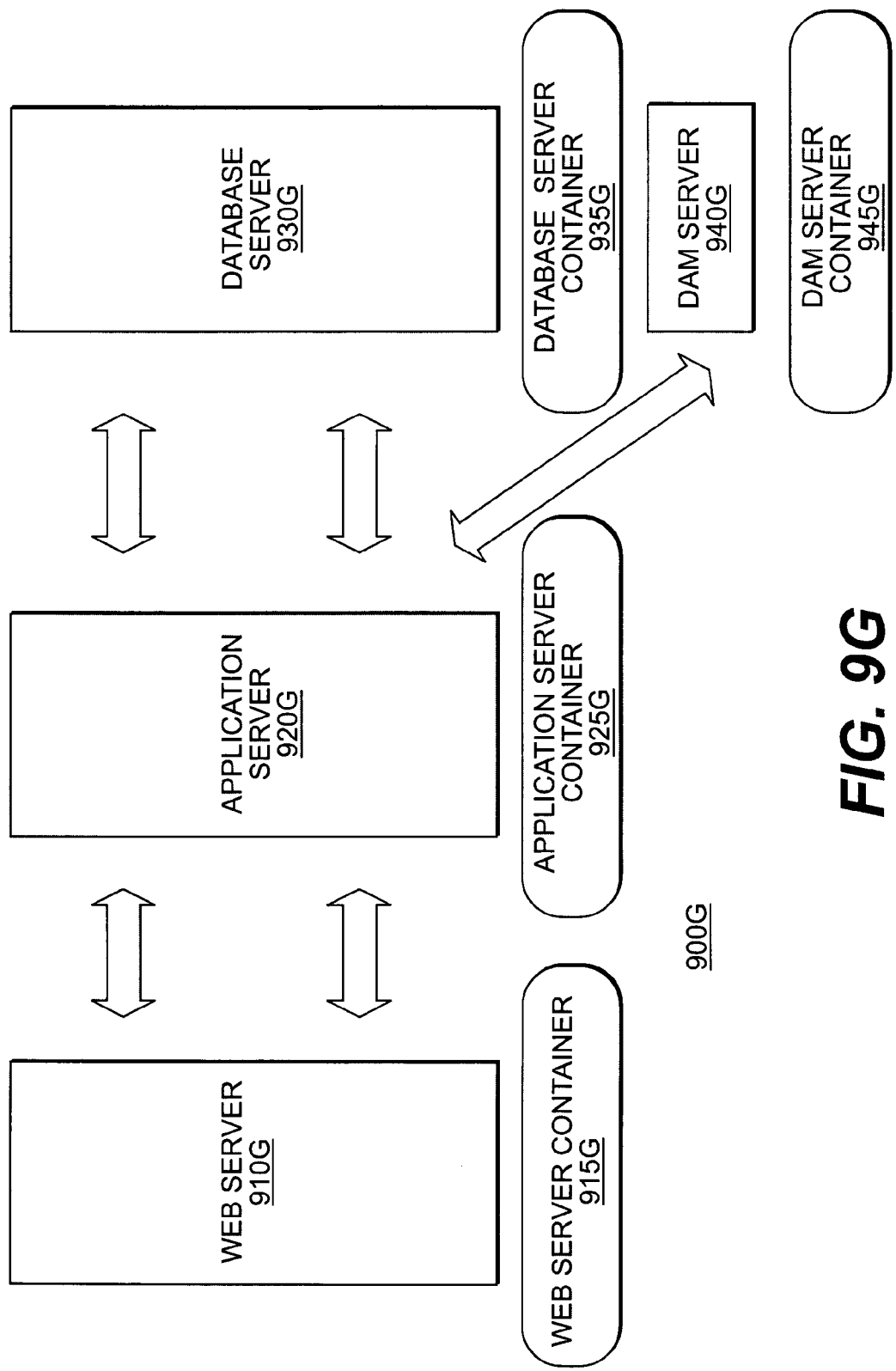

FIG. 9G shows an exemplary macro-level service pattern 900G associated with a web media/application pattern in a multi-tier system including a web server 910G, application server 920G, database server 930G, and a DAM server 940G. Each server is associated with a corresponding service container 91 5G, 925G, 935G, and 945G, and corresponding mapped components. For example, the components deployed in exemplary service pattern 900G include JSP, Servlets, EJB, JB, MDB, JDBC, and Java Media extension components.

Figure 9H:
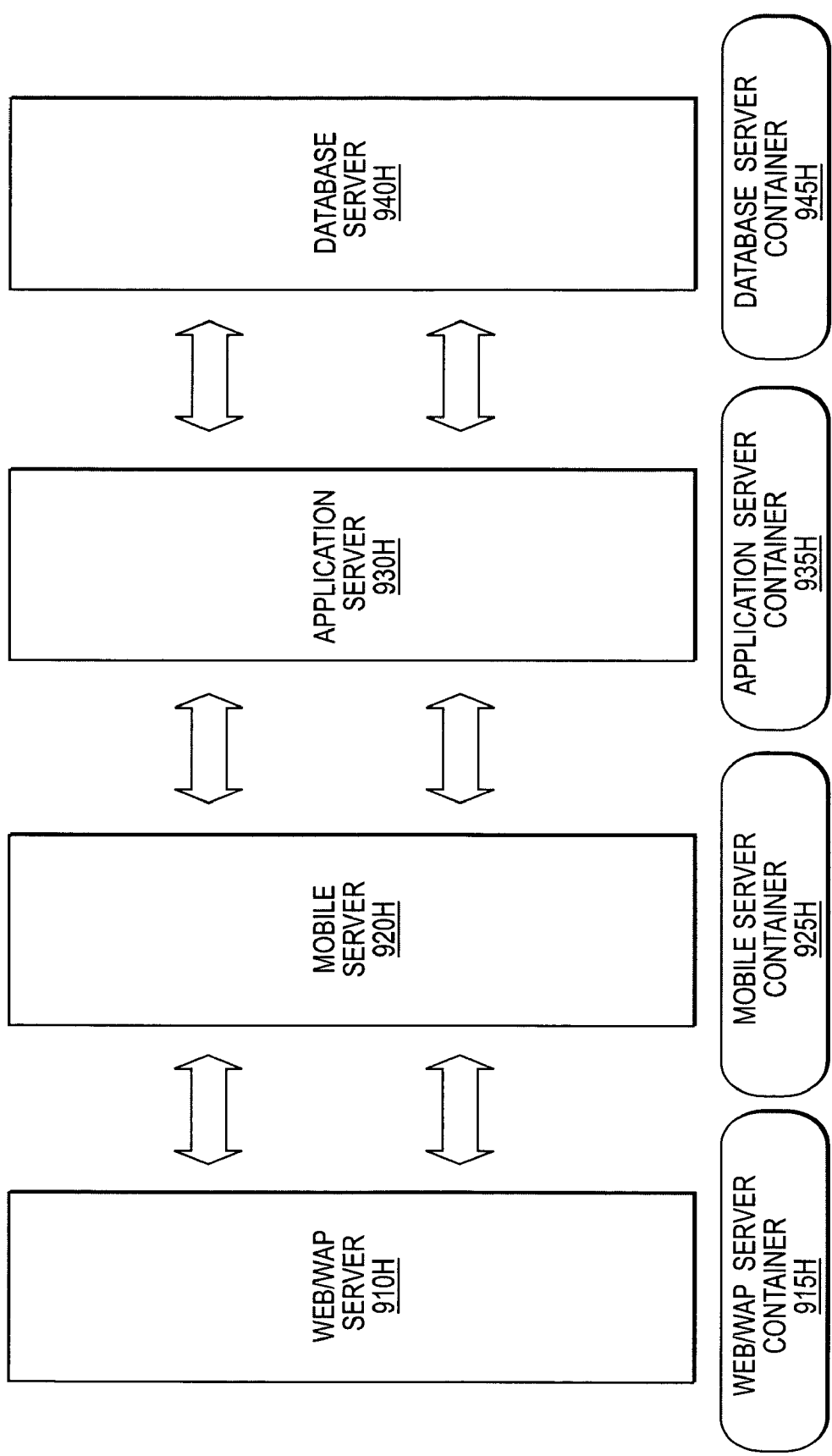

FIG. 9H shows an exemplary macro-level service pattern 900H associated with a mobile web application in a multi-tier system including a web/WAP server 910H, mobile server 920H, application server 930H, and a database server 940H. Each server is associated with a corresponding service container 915H, 925H, 935H, and 945H, and corresponding mapped components. For example, the components deployed in exemplary service pattern 900H include JSP, Servlets, midlets, applets, EJB, JB, MDB, and JDBC components.

Figure 9I:
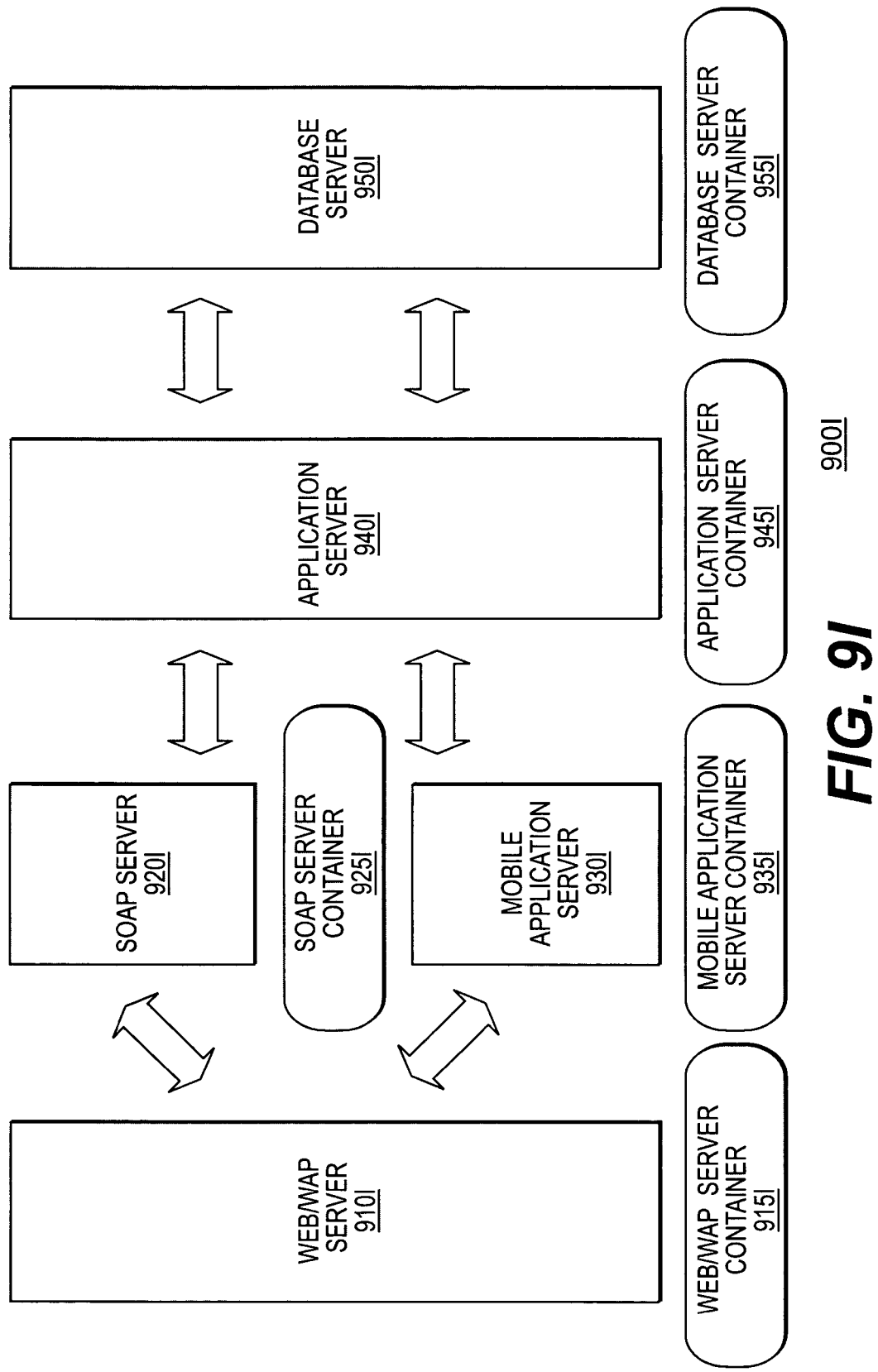

FIG. 9I shows an exemplary macro-level service pattern 900I associated with a mobile/web service pattern in a multi-tier system including a web/WAP server 910I, a SOAP server 920I, a mobile application server 930I, application server 940I, and a database server 950I. Each server is associated with a corresponding service container 915I, 925I, 935I, 945I, and 955I, and corresponding mapped components. For example, the components deployed in exemplary service pattern 900F include JSP, Servlets, SOAP, XML, midlet, applet, JSP tags, EJB, JB, MDB and JDBC components.

In one aspect of the invention, the CAE deployment process may also allow a user or a software process (e.g., CAE 722) to automatically determine micro-level service patterns that correspond to particular macro-level service patterns FIG. 8, (Step 840). A micro-level service pattern may represent a further refinement of the configurations included in the macro-level service patterns. Accordingly, the micro-level service patterns may provide system environment 400 another level of configuration granularity to provide services and/or applications to one or more consumers. For example, micro-level service patterns may be associated with scalability, availability, and security capabilities of system environment 400. In one aspect of the invention, the scaling patterns identified in Appendix A, "Scaling J2EE Technology Applications Based on Application Infrastructure Techniques," by Rakesh Radhakrishnan, 2001, may be considered micro-level service patterns consistent with certain aspects related to the present invention. As shown in Appendix A, various scaling techniques may be applied to various macro-level service patterns based on the type of resources used to provide certain types of services and/or applications.

Further, the availability patterns identified in Appendix B, "Maximizing uptime for J2EE Applications Based on Application Infrastructure HA Techniques," may be considered micro-level service patterns consistent with certain aspects related to the present invention. As shown in Appendix B, various availability techniques may be applied to various macro-level service patterns based on the type of resources that provide certain type of services and/or applications.

Also, the security patterns identified in Appendix C, "Securing J2EE based Web Applications and Web Services Based on Application Infrastructure Security Techniques," may be considered micro-level service patterns consistent with certain aspects related to the present invention. As shown in Appendix C, various security techniques may be applied to various macro-level service patterns based on the type of resources that provide certain type of services and/or applications.

The macro and micro-level service patterns may be stored as templates in a database and used by CAE 722 to dynamically provision services and/or applications to consumers.

Figure 10:
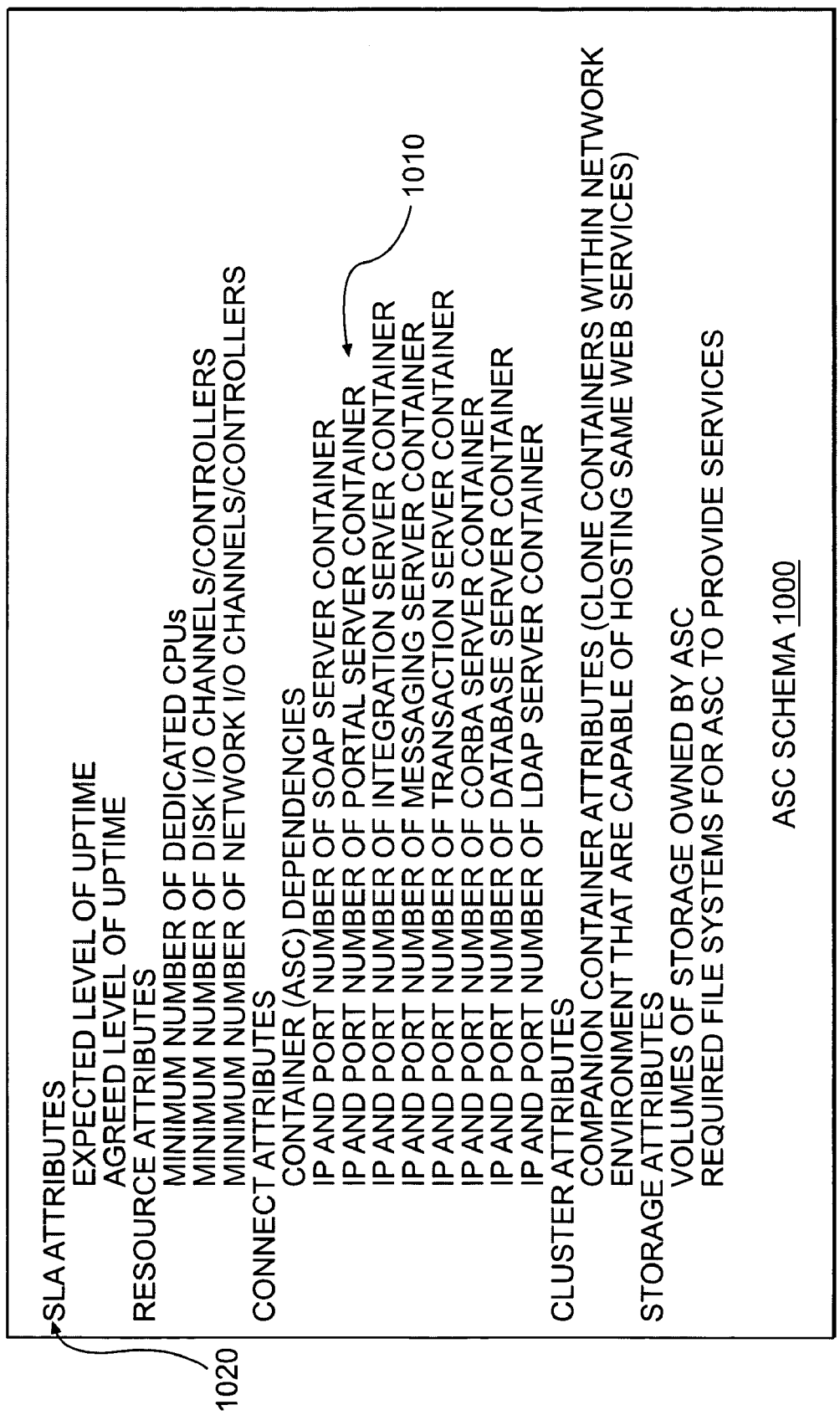
FIG. 10 shows an exemplary application service container schema consistent with certain aspects related to the present invention.
Figure 11:
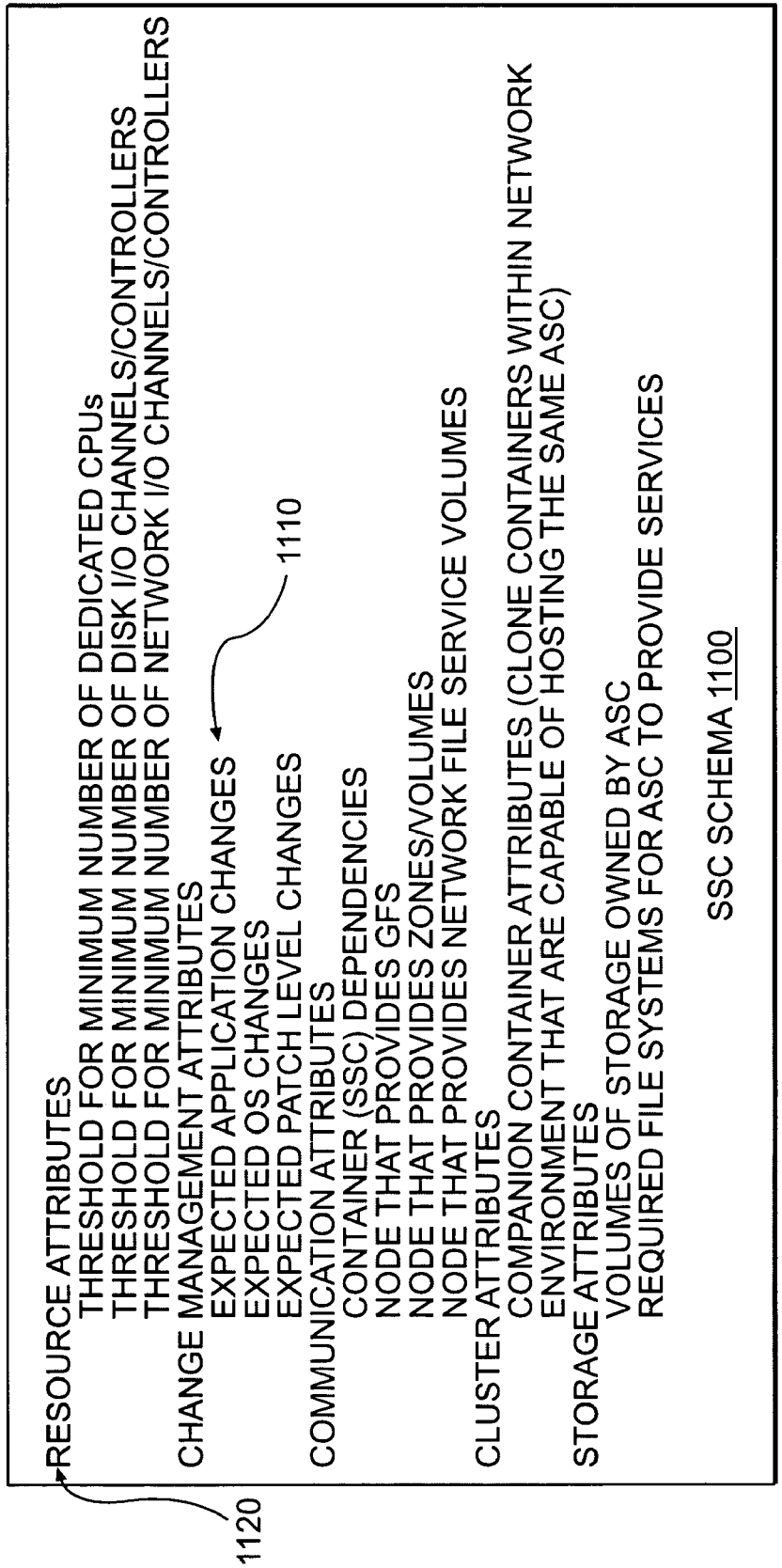
FIG. 11 shows an exemplary system service container schema consistent with certain aspects related to the present invention.

The CAE deployment process may include defining one or more container metrics associated with each web service (Step 850). A container metric may be an attribute associated with various characteristics of a service provided by system environment 400. For example, container metrics may be associated with SLA attributes, resource attributes, connect attributes, cluster attributes, and/or storage attributes of a service. In one aspect of the invention, container metrics may be defined in schemas associated with ASC 710-2 and SSC 710-3 for each service deployed in environment 400. For example, a service description may include a sub-tree with an ASC schema that includes one or more attributes associated with the service. FIG. 10 shows an exemplary ASC schema 1000 that includes a plurality of metrics 1010 for various attributes 1020 of the service. Each ASC schema may have its own identifiers associated with ASC 710-2 of a resource. Further, each ASC schema may have a matching SSC schema that include related attributes corresponding to system characteristics of system environment 400. FIG. 11 shows an exemplary SSC schema 1100 including a plurality of metrics 1110 for various attributes 1120 related to ASC attributes 1020.

The CAE deployment process may also include defining one or more container rules that are used by CAE 722 to dynamically adjust various resource characteristics to maintain or meet the response time, uptime, and security levels defined in a service's SLA (Step 860). In one aspect of the invention, a user (e.g., system developer) or a software based process (e.g., expert system) may define the container rules based on events, triggers, threshold levels, container dependencies, temporal information, etc. For example, a container rule may determine whether a particular event (e.g., a compute resource fails) occurs and initiates a corresponding action based on the determination, such as replacing the failed compute resource with an alternate or backup resource. Another exemplary container rule may determine whether a number of CPUs running in a resource providing a service is above a threshold value (e.g., maximum 4 CPUs to provide a service). If the threshold is exceeded, the exemplary rule may define an appropriate action, such as implementing another resource or resources to reduce the number of CPUs used by the resource providing the service. The defined container rules may be stored in a database, such as database 740.

Once the appropriate rules, service patterns, metrics, etc. are defined and stored, system environment 400 may deploy and begin running the web services and/or applications based on requests from one or more consumers (Step 870).

Providing Services and/or Applications in a CAE Environment

Figure 12:
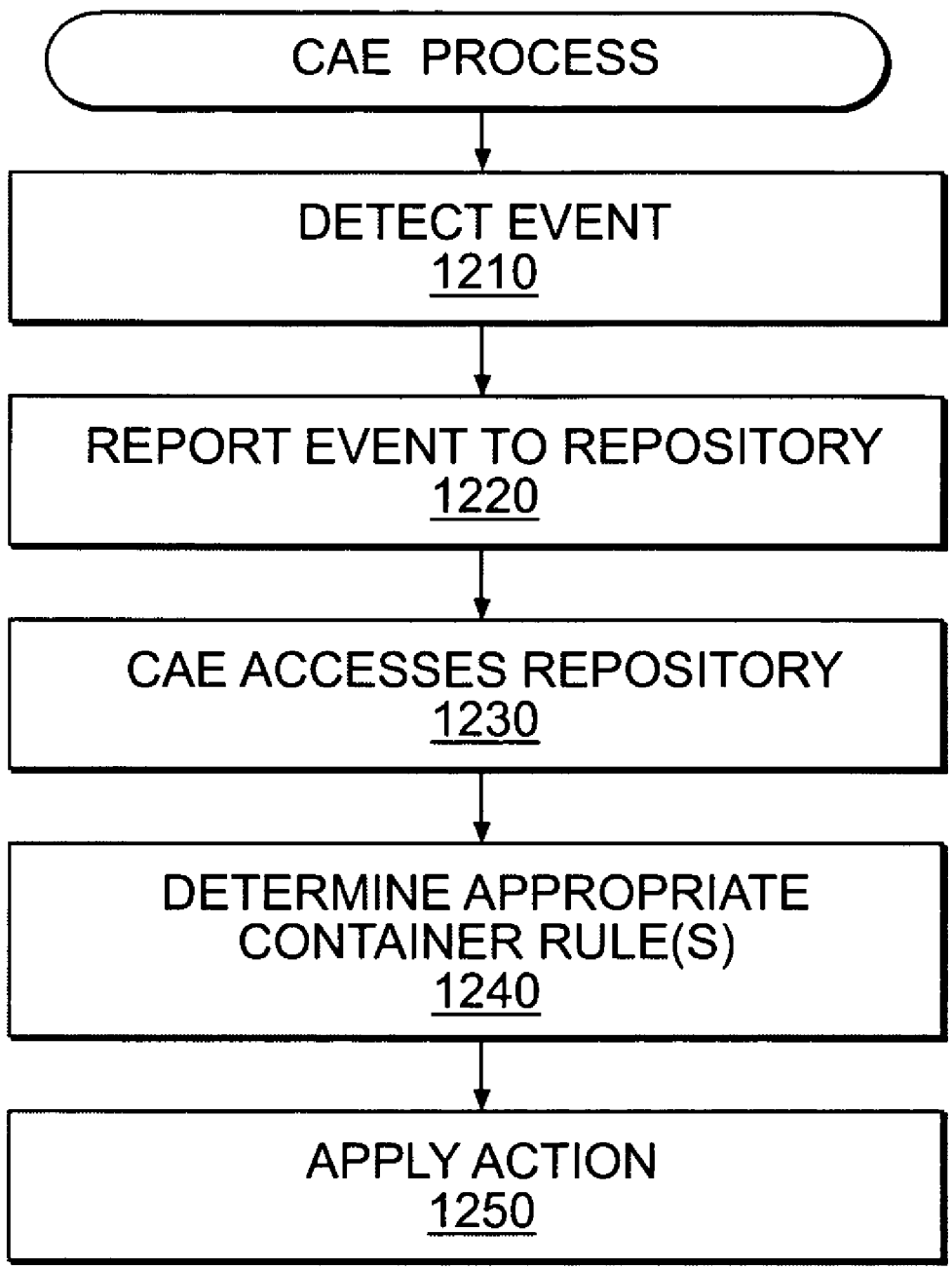
FIG. 12 is a flowchart of an exemplary CAE process consistent with certain aspects related to the present invention.

During runtime, CAE 722 may access the rules database to dynamically adjust the administrative and/or performance characteristics of system environment 400 by leveraging SSC 710-3. FIG. 12 shows a flowchart of an exemplary CAE process consistent with certain aspects related to the present invention.

During runtime, system environment 400 may provide one or more web services and/or applications to one or more consumers, such as clients 110-1 to 110-X. Although a consumer may represent any entity that requests and uses a service and/or application, for purposes of explaining the CAE process, client 110-1 represents a consumer. Accordingly, client 110-1 may request a service from a service provider (e.g., one or more resources 700) located in environment 430-1 to 430-N through network 420.

As the provider runs the service, ASC 710-2 may monitor application level metrics associated with the service. For example, ASC 710-2 may be configured to monitor a number of active user sessions for a service for a predetermined period of time, such as a holiday season (e.g., December 20 through January 10). During the designated time period, ASC 710-2 may generate event data associated with the monitored metrics and store the event data in repository 330 (e.g., database 740) using known database calls, such as Java Naming Directory Interface (JNDI) calls. At the same time, prior to, or subsequent to, ASC 710-2 reporting event data to repository 330, SSC 710-3 may also monitor system level metrics associated with the service. SSC 710-3 may also generate and provide event data associated with the monitored metrics in repository 340 (e.g., database 740). For example, during the above exemplary service monitored by ASC 710-2, SSC 710-3 may monitor system attributes associated with the one or more resources 700 that provide the service. For instance, SSC 710-3 may determine whether a minimum amount of storage space is compromised during execution of the service. Event data associated with the monitored storage metric may be created and provided to repository 340.

Accordingly, during runtime of the service, ASC 710-2 and/or SSC 710-3 may detect an event based on preprogrammed thresholds, event identifiers, time stamp information, etc. (Step 1210). Based on the detected events, ASC 710-2 and 710-3 may generate and provide corresponding event data to database 740, which in this example, acts as a central repository for both ASC 710-2 and SSC 710-3 (Step 1220).

Periodically, or on demand (e.g., whenever CAE 722 detects an update in repository 740), CAE 722 may access repository 740 to collect the stored event data provided by ASC 710-2 and/or SSC 710-3 (Step 1230). CAE 722 may also access the storage device that includes the container rules defined in Step 860 of FIG. 8. Based on the collected event data, CAE 722 may apply one or more corresponding container rules to determine an appropriate action or actions (Step 1240). Once the action, or actions are determined, CAE 722 may apply the action to dynamically enforce application and system service container scaling, availability, and/or security techniques (Step 1250).

In one aspect of the invention, CAE 722 may use container rules that are based on one or more deployment scenarios, such as those previously described, to align one or more SSCs 710-3 to one or more ASCs 710-2. For instance, following the above example regarding the active sessions monitored during the holiday season of December 20 to January 10, CAE 722 may locate a container rule that applies an action when ASC 710-2 detects when the number of active sessions over a predetermined period of time (e.g., 12 hour period during the date range of December 20 to January 10) exceeds a predetermined threshold level. The exemplary action may be to redefine an SSC 710-3 that is supporting the ASC 710-2 hosting the service such that it includes more processing capabilities provided by other resources 700. For example, the exemplary SSC 710-3 may originally be running as a 12 CPU/96 GB server with limited I/O capabilities. Based on the exemplary container rule, CAE 722 may change the exemplary SSC 710-3 to a 400CPU/3.2 TB server with high I/O throughput to storage resources to run one or more ASCs 710-2 of a database server resource.

In another example, suppose ASC 710-2 is configured to provide security services in environment 400, such as hosting a billing system service with secure data maintained in a database resource. The billing service is expected to behave in a certain way defined in the ASC's schema. During runtime, ASC 710-2 may monitor and detect an anomaly with the service's behavior (e.g., an illegal read or write operation from an unauthorized source, a storage resource failure, etc.). Based on the detected anomaly, ASC 710-2 may generate event data indicating the detected anomaly and report it to repository 330. CAE 722 may read this event data and based on this data and event data provided by SSC 710-3, may direct SSC 710-3 to perform an appropriate action, such as terminate the use of that ASC 710-2.

Accordingly, CAE 722 is configured to continuously align the container techniques associated with ASC 710-2 and SSC 710-3 to meet any defined and/or changed business goals, SLAs, and ASC and SSC requirements associated with a particular service, application and/or system environment 400.

Defining and/or Updating Container Rules and Metrics

As described, CAE 722 may apply one or more container rules to dynamically align and/or realign ASC 710-2 and SSC 710-3 during runtime. In one aspect of the invention, the container rules may be updated, deleted, added, etc. during runtime such that CAE 722 may apply these rules for maintaining the scalability, availability, and security techniques associated with ASC 710-2 and SSC 710-3. In this aspect of the invention, a system environment 400 that may include a CAE manager (not shown) that may be any type of known computing system, such as a desktop computer, a server system, etc. The CAE manager may include interface software and hardware that allows a user, or software process, to define, modify, and delete container rules that are deployed in system environment 400 through CAE 722 and repositories 330, 340. Further, the user or software process may define ASC and SSC types, attributes, and metrics using the CAE manager. For example, to change or define a container rule, the user may program the rule and publish it in a directory using the CAE manager. Following publication, resources in system environment 400 that host CAE 722 may perform a refresh operation to update any container rules in their associated repositories. Accordingly, CAE 700 may then use the updated rule in the next alignment process that occurs based on an appropriate trigger or event that initiates the rule.

Container Based Security

The distributed nature of system environment 400 may present locality issues associated with the resources included in the environment. Accordingly, certain aspects of the present invention allow SSC 710-3 to be configured as a distributed firewall with firewall capabilities that ensure locality principals associated with the resources are maintained. For example, SSC 710-3 may perform firewall processes that allow it to act as external and/or internal firewalls 402 and 404, respectively. Therefore, as CAE 722 initiates adjustments to the alignment between SSC 710-3 and ASC 710-2, SSC 710-3 may also maintain security requirements associated with resource and/or service assignments to certain domains defined in system environment 400 due to the distributed nature of SSC 710-3 in each resource 700.

In one aspect of the invention, SSC 710-3 may consider the types of services hosted by ASC 710-2 and configure a virtual security domain to ensure data and/or service access is controlled. For example, consider a scenario where ASC 710-2 hosts five types of services, Network Access Services (NAS), Network Identity Services (NIS), Network Portal Services (NPS), Network Computing Service (NCS), and Network Data Services (NDS).

NAS may host application infrastructure components that act as touch points to external clients from network 420 and may require dedicated nodes with certain hardware dependencies. For example, NAS may include web proxies (e.g., reverse proxies for web containers included in NCS). Also, NAS may include portal gateways (e.g., portlet and netlet components that enable secure communications over Secured Sockets Layer (SSL) between clients 410-1 to 410-X to a portal server within NPS. Further, NAS may include WAP gateways (e.g., proxies that allow access to a WAP server within NPS or NCS), external message transfer agents (e.g., a mail proxy/relay that allows secure access to internal message transfer agent servers). Also, NAS may include LDAP proxies and UDDI pointers that are a directory access router that acts as a pointer to internal LDAP servers and private/public UDDI registers. NAS may also include other types of access control resources, such as SOAP handlers (e.g., a handler that allows secure access to SOAP enabled services) and CORBA gateways (e.g., proxies that allow secure access to an internal ORB server).

NIS may include an identity server which is a policy server that manages role based access to services. NIS may also include a directory server that stores user data, context data, certificates, etc., and a LDAP integration server which maintains a virtual directory of meta data. Further NIS may include a LDAP replica servers that are redundant LDAP servers that host certain LDAP data, and a LDAP access router that is an intelligent directory router that routes access to LDAP data based on load, data, schemas, etc. Also, NIS may include a CMS server that is a PKI based certificate server that validates identity of users, devices, networks, and servers.

NPS may include a portal platform server that aggregates content, personalizes profiles of users that allows for customization and personalization of services for a consumer, such as clients 410-1 to 410-X. Also, NPS may include a caching server that is a network server that caches frequently requested content by the portal server to the network dedicated for portal services. Further, NPS may include a content management server that allows for multiple content administrators to manage the content offered by the portal server.

NCS may include a web server that hosts the web container with Servlets and JSPs. Also, NCS may include a WAP server that hosts a container with Wireless Markup Language (WML) components and a transcoding server that translates presentation logic based on JSP tags for one or more devices in environment 400. Further, NCS may include a mobile application server that hosts a process that hosts web applications, and an application server that hosts a container with EJB and JB components. NCS may also include integration servers that hosts EAI and/or B2B components, such as SOAP objects, JMS, and JTS components. Additionally, NCS may include a database server that provides access to one or more databases.

Figure 13:
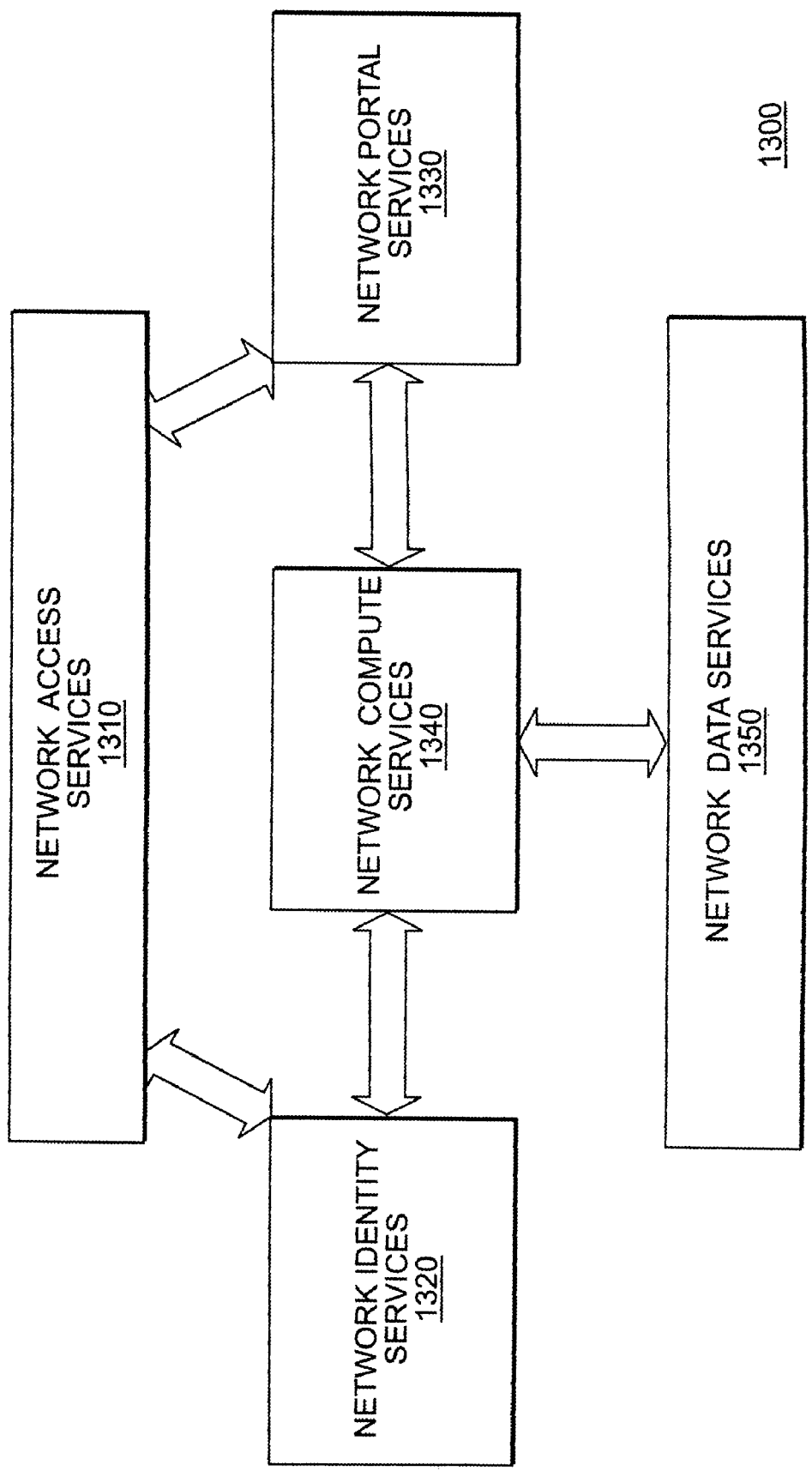
FIG. 13 is a block diagram of an exemplary system security model consistent with certain aspects related to the present invention.

In one aspect of the invention, SSC 710-3 may control ASC hosted services based on a predetermined service access configuration. FIG. 13 shows an block diagram of an exemplary secure service configuration 1300 consistent with certain embodiments related to the present invention. As shown, configuration 1300 includes an access construct that ensures services located within NAS 1310 are allowed access to services within NIS 1320 and connects to access services within NPS 1330. Further, services within NAS 1310 are not permitted services residing in NCS 1340 or NDS 1350. Also, services within NDS 1350 can only be accessed by services within NCS 1340.

Accordingly, certain aspects of the present invention enable environment 400 to implement a multi-layered security scheme, such that a top layer of services deployed as network access services may secure access to external entities by ensuring devices, services, and/or connections from network 420 may only gain authenticated access to the servers within NAS. A lower layer of services deployed as a NIS may apply various security techniques associated with consumer access control, such as authentication, authorization, virus checking, Spam control, intrusion detection, certificate and identity validations, etc. Below the NIS layer, may be a layer of services deployed as network application/web services where the actual services are located (e.g., applications, data stores, etc.). This layer control access using role based interfaces that limit the inter-service communications and consumer interactions.

In another aspect of the invention, another multi-layered security scheme may be employed in environment 400 that controls access for consumers, such as clients 410-1 to 410-X. In this aspect of the invention, environment 400 may implement a top virtual application layer that includes security techniques that establishes secure network connections with clients 410-1 to 410-X. A lower application infrastructure layer that is configured with processes that deploys of a reverse proxy web server or portal gateway server in a secure environment based on the consumer accesses in the virtual application layer. The reverse proxy web server and portal gateway may be located in a network infrastructure layer implemented below the application infrastructure layer.

CONCLUSION

As described, systems, methods, and articles of manufacture consistent with certain aspects related to the present invention enable a CAE to dynamically align ASC and SSC techniques to ensure availability, scalability, and security requirements are maintained at a level associated with predetermined business goals and/or service descriptions/agreements. Although certain aspects of the present invention are described herein as being associated with a J2EE compliant platform, one skilled in the art will appreciate that other types of configurations are applicable without departing from the scope of the present invention.

The foregoing description of implementations of the invention has been presented for purposes of illustration and description. It is not exhaustive and does not limit the invention to the precise form disclosed. Modifications and variations are possible in light of the above teachings or may be acquired from practicing of the invention. Additional modifications and variations of the invention may be, for example, the described implementation includes software but the present invention may be implemented as a combination of hardware and software or in hardware alone. The invention may be implemented with both object-oriented and non-object-oriented programming systems. For instance, instead of software based on the Java programming language, other types of languages may be implemented by methods, systems, and articles of manufacture consistent with certain aspect of the invention.

Additionally, the processes described above with respect to FIGS. 8 and 12 are not limited to the sequences illustrated in these figures. One skilled in the art will appreciate that variations to the sequence of steps included in these processes may vary without departing from the scope of the invention. Further, additional steps may be included in these processes to provide features consistent with aspects of the invention.

Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A method for deploying a container alignment environment including service containers distributed across resources in the environment that provides one or more services to a consumer, the method including:
    defining one or more macro-level service patterns representing predetermined resource configurations in the environment;
    defining, based on the defined one or more macro-level patterns, one or more micro-level service patterns representing additional resource configurations within a corresponding macro-level service pattern;
    defining one or more application service metrics associated with an application service container distributed across the resources;
    defining one or more system service metrics associated with a system service container distributed across the resources;
    defining one or more container rules that initiate an action based on a detected event by at least one of the application service container and the system service container; and
    providing the one or more services to the consumer, such that the one or more container rules are used to maintain a predetermined service level for the one or more services.

2. The method of claim 1, wherein defining the micro-level service patterns is automatically performed by a container alignment engine that is distributed across one or more of the resources included in the environment.

3. The method of claim 1, wherein defining one or more container rules includes:
    storing the one or more container rules in a database that is accessed by a container alignment engine configured to align the application and system service containers while providing the one or more services to the consumer.

4. The method of claim 3, wherein the container alignment engine is configured to align the application and system service containers by adjusting at least one of dependencies between the application and system service containers, scaling characteristics, availability characteristics, and security characteristics associated with a resource that hosts at least one of the application and system service containers.

5. The method of claim 1, wherein defining one or more macro-level service patterns includes:
    defining the one or more macro-level service patterns based on a type of service provided by one or more of the resources in the environment.

6. The method of claim 1, wherein the application service metrics are associated with one or more application service attributes corresponding to a type of service hosted by the application service container.

7. The method of claim 6, wherein the system service metrics are associated with one or more system service attributes corresponding to one or more of the application service attributes.

8. The method of claim 1, further including:
    determining one or more alignment scenarios for the system service and application service containers.

9. The method of claim 8, wherein the one or more alignment scenarios includes at least one of aligning a single application service container to a single system service container, aligning multiple application service containers to a single system service container, aligning a single application service container to multiple system service containers, and aligning multiple application service containers to multiple system service containers.

10. The method of claim 1, wherein defining the one or more container rules includes:
    defining the one or more container rules based on at least one of a service level agreement associated with a service and a business goal provided to the environment from an external source.

11. The method of claim 1, wherein the application service and system service containers are service containers associated with an open network architecture.

12. The method of claim 1, wherein the application service container is a service container associated with a Sun ONE architecture.

13. The method of claim 1, wherein the system service container is a service container provided by an operating system.

14. The method of claim 13, wherein the operating system is a Solaris operating system.

15. The method of claim 13, wherein the operating system is deployed on a distributed platform operating in an N1 architecture.

16. A system for deploying a container alignment environment including service containers distributed across resources in the environment that provides one or more services to a consumer, the system including:

means for defining one or more macro-level service patterns representing predetermined resource configurations in the environment;

means for defining, based on the defined one or more macro-level patterns, one or more micro-level service patterns representing additional resource configurations within a corresponding macro-level service pattern;

means for defining one or more application service metrics associated with an application service container distributed across the resources;

means for defining one or more system service metrics associated with a system service container distributed across the resources;

means for defining one or more container rules that initiate an action based on a detected event by at least one of the application service container and the system service container; and means for providing the one or more services to the consumer, such that the one or more container rules are used to maintain a predetermined service level for the one or more services.

17. The system of claim 16, wherein the means for defining the micro-level service patterns is automatically performed by a container alignment engine that is distributed across one or more of the resources included in the environment.

18. The system of claim 16, wherein the means for defining one or more container rules includes:

means for storing the one or more container rules in a database that is accessed by a container alignment engine configured to align the application and system service containers while providing the one or more services to the consumer.

19. The system of claim 18, wherein the container alignment engine is configured to align the application and system service containers by adjusting at least one of dependencies between the application and system service containers, scaling characteristics, availability characteristics, and security characteristics associated with a resource that hosts at least one of the application and system service containers.

20. The system of claim 16, wherein the means for defining one or more macro-level service patterns includes:

means for defining the one or more macro-level service patterns based on a type of service provided by one or more of the resources in the environment.

21. The system of claim 16, wherein the application service metrics are associated with one or more application service attributes corresponding to a type of service hosted by the application service container.

22. The system of claim 21, wherein the system service metrics are associated with one or more system service attributes corresponding to one or more of the application service attributes.

23. The system of claim 16, further including:

means for determining one or more alignment scenarios for the system service and application service containers.

24. The system of claim 23, wherein the one or more alignment scenarios includes at least one of aligning a single application service container to a single system service container, aligning multiple application service containers to a single system service container, aligning a single application service container to multiple system service containers, and aligning multiple application service containers to multiple system service containers.

25. The system of claim 16, wherein the means for defining the one or more container rules includes:

means for defining the one or more container rules based on at least one of a service level agreement associated with a service and a business goal provided to the environment from an external source.

26. The system of claim 16, wherein the application service and system service containers are service containers associated with an open network architecture.

27. The system of claim 16, wherein the application service container is a service container associated with a Sun ONE architecture.

28. The system of claim 16, wherein the system service container is a service container provided by an operating system.

29. The system of claim 28, wherein the operating system is a Solaris operating system.

30. The system of claim 28, wherein the operating system is deployed on a distributed platform operating in an N1 architecture.

31. A computer-readable medium including instructions for performing a method, when executed by a processor, for deploying a container alignment environment including service containers distributed across resources in the environment that provides one or more services to a consumer, the method including:

defining one or more macro-level service patterns representing predetermined resource configurations in the environment;

defining, based on the defined one or more macro-level patterns, one or more micro-level service patterns representing additional resource configurations within a corresponding macro-level service pattern;

defining one or more application service metrics associated with an application service container distributed across the resources;

defining one or more system service metrics associated with a system service container distributed across the resources;

defining one or more container rules that initiate an action based on a detected event by at least one of the application service container and the system service container; and providing the one or more services to the consumer, such that the one or more container rules are used to maintain a predetermined service level for the one or more services.

* * * * *